United States Patent
Komatsu et al.

(10) Patent No.: US 12,314,440 B2
(45) Date of Patent: May 27, 2025

(54) INFORMATION PROCESSING METHOD, INFORMATION PROCESSING SYSTEM, AND NON-TRANSITORY COMPUTER READABLE MEDIUM

(71) Applicant: KABUSHIKI KAISHA TOSHIBA, Tokyo (JP)

(72) Inventors: Misaki Komatsu, Kanagawa (JP); Yoshikazu Hanatani, Tokyo (JP); Tsukasa Omino, Tokyo (JP); Tomoko Yonemura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 574 days.

(21) Appl. No.: 17/469,436

(22) Filed: Sep. 8, 2021

(65) Prior Publication Data
US 2022/0147655 A1    May 12, 2022

(30) Foreign Application Priority Data
Nov. 6, 2020    (JP) .................................. 2020-186064

(51) Int. Cl.
*H04L 29/06*    (2006.01)
*G06F 21/62*    (2013.01)
*H04L 9/06*    (2006.01)

(52) U.S. Cl.
CPC ........ *G06F 21/6254* (2013.01); *H04L 9/0643* (2013.01)

(58) Field of Classification Search
CPC ... G06F 21/6254; G06F 21/64; H04L 9/0643; H04L 2209/42; H04L 9/3239; H04L 9/50
See application file for complete search history.

(56) References Cited

U.S. PATENT DOCUMENTS 11,403,424 B2 *  8/2022  Takahashi .............. H04L 9/0643
11,816,191 B2 *  11/2023  Hiratsuka .............. H04L 9/0819
(Continued)

FOREIGN PATENT DOCUMENTS

JP       6601623 B2     11/2019
JP       6608256 B2     11/2019
(Continued)

*Primary Examiner* — Shin-Hon (Eric) Chen
*Assistant Examiner* — Vladimir I Gavrilenko
(74) *Attorney, Agent, or Firm* — Finnegan, Henderson, Farabow, Garrett & Dunner, LLP

(57) ABSTRACT

According to one embodiment, an information processing method performed by a computer includes receiving a holding request that includes target data and first identification information regarding the target data to generate second identification information different from the first identification information; generating first pseudonymized data that includes the second identification information and the target data, and holding the first pseudonymized data in a first hardware holding device; generating first pseudonymous association data that associates the first identification information with the second identification information, and storing the first pseudonymous association data in a first hardware storage; calculating a first value by an operation based on the first pseudonymous association data; and providing first record information for a storage system, the storage system being configured to store the first record information, the first record information including the first value and including first information based on the first identification information.

17 Claims, 19 Drawing Sheets

(56) References Cited

U.S. PATENT DOCUMENTS

2019/0384594 A1   12/2019   Michiyama et al.
2021/0083843 A1*   3/2021   Salomon ............... G06F 21/602

FOREIGN PATENT DOCUMENTS

| | | |
|---|---|---|
| JP | 2019-220146 A | 12/2019 |
| JP | 2020-13175 A | 1/2020 |
| JP | 6731783 B2 | 7/2020 |

* cited by examiner

DATA RECEPTION RECORD INFORMATION

| ITEM | VALUE | DESCRIPTION |
|---|---|---|
| RECEIPT YEAR/MONTH/DATE | YYYY/MM/DD | |
| PERSONAL CONSENT | CONSENT ID | PROVIDER ID, PERSONAL ID, DATA TYPE, AND DATA ITEM CAN BE IDENTIFIED |
| PROVIDER | PROVIDER ID | NAME, ADDRESS, AND REPRESENTATIVE CAN BE IDENTIFIED |
| DATA ITEM | DATA TYPE ID | |
| ASSOCIATION DATA VERIFICATION VALUE | HASH VALUE OF PSEUDONYMOUS ASSOCIATION DATA | |
| PSEUDONYMIZED DATA VERIFICATION VALUE | HASH VALUE OF PSEUDONYMIZED DATA | |

BLOCK EXAMPLE OF DATA RECEPTION RECORD

| ITEM | VALUE | DESCRIPTION |
|---|---|---|
| RECORD ID | BC TRANSACTION ID | |
| USER ID | BC USER ID | BLOCKCHAIN USER ID OF HOLDING BUSINESS OPERATOR |
| RECEIPT YEAR/MONTH/DATE | YYYY/MM/DD | |
| PERSONAL CONSENT | CONSENT ID | |
| PROVIDER | PROVIDER ID | PROVIDER ID, PERSONAL ID, DATA TYPE, AND DATA ITEM CAN BE IDENTIFIED |
| DATA ITEM | DATA TYPE ID | NAME, ADDRESS, AND REPRESENTATIVE CAN BE IDENTIFIED |
| ASSOCIATION DATA VERIFICATION VALUE | HASH VALUE OF PSEUDONYMOUS ASSOCIATION DATA | |
| PSEUDONYMIZED DATA VERIFICATION VALUE | HASH VALUE OF PSEUDONYMIZED DATA | |
| PREVIOUS BLOCK VERIFICATION VALUE | HASH VALUE OF PREVIOUS BLOCK | |
| DIGITAL SIGNATURE | DIGITAL SIGNATURE | DIGITAL SIGNATURE GENERATED WITH BC PRIVATE KEY OF HOLDING BUSINESS OPERATOR (BC USER) IDENTIFIED BY BC USER ID |

DATA ANALYSIS RECORD INFORMATION

| ITEM | VALUE | DESCRIPTION |
|---|---|---|
| ANALYSIS YEAR/MONTH/DATE | YYYY/MM/DD | |
| PERSONAL CONSENT | CONSENT ID | |
| ANALYZER | ANALYZER ID | PERSONAL ID, DATA TYPE, AND DATA ITEM CAN BE IDENTIFIED |
| DATA ITEM | DATA TYPE ID | NAME, ADDRESS, AND REPRESENTATIVE CAN BE IDENTIFIED |
| ASSOCIATION DATA VERIFICATION VALUE | HASH VALUE OF ANALYSIS ASSOCIATION DATA | |
| ANALYTICAL DATA VERIFICATION VALUE | HASH VALUE OF ANALYSIS RESULT DATA ASSIGNED MANAGEMENT IDENTIFIER | |

FIG. 11

BLOCK EXAMPLE OF DATA ANALYSIS RECORD

| ITEM | VALUE | DESCRIPTION |
|---|---|---|
| RECORD ID | BC TRANSACTION ID | |
| USER ID | BC USER ID | BLOCKCHAIN USER ID OF ANALYSIS BUSINESS OPERATOR |
| ANALYSIS YEAR/MONTH/DATE | YYYY/MM/DD | |
| PERSONAL CONSENT | CONSENT ID | PERSONAL ID, DATA TYPE, AND DATA ITEM CAN BE IDENTIFIED |
| ANALYZER | ANALYZER ID | NAME, ADDRESS, AND REPRESENTATIVE CAN BE IDENTIFIED |
| DATA ITEM | DATA TYPE ID | |
| ASSOCIATION DATA VERIFICATION VALUE | HASH VALUE OF ANALYSIS ASSOCIATION DATA | |
| ANALYTICAL DATA VERIFICATION VALUE | HASH VALUE OF ANALYSIS RESULT DATA ASSIGNED MANAGEMENT IDENTIFIER | |
| PREVIOUS BLOCK VERIFICATION VALUE | HASH VALUE OF PREVIOUS BLOCK | |
| DIGITAL SIGNATURE | DIGITAL SIGNATURE | DIGITAL SIGNATURE GENERATED WITH BC PRIVATE KEY OF ANALYSIS BUSINESS OPERATOR (BC USER) IDENTIFIED BY BC USER ID |

FIG. 12

DATA ANALYSIS RECORD INFORMATION

| ITEM | VALUE | DESCRIPTION |
|---|---|---|
| ANALYSIS YEAR/MONTH/DATE | YYYY/MM/DD | |
| PERSONAL CONSENT | CONSENT ID OR LIST | PERSONAL ID, DATA TYPE, AND DATA ITEM CAN BE IDENTIFIED |
| ANALYZER | ANALYZER ID | NAME, ADDRESS, AND REPRESENTATIVE CAN BE IDENTIFIED |
| DATA ITEM | DATA TYPE ID | |
| ASSOCIATION DATA VERIFICATION VALUE | HASH VALUE OF ASSOCIATION DATA | |
| ANALYTICAL DATA VERIFICATION VALUE | HASH VALUE OF ANALYSIS RESULT DATA ASSIGNED MANAGEMENT IDENTIFIER | |

FIG. 17

BLOCK EXAMPLE OF DATA ANALYSIS RECORD

| ITEM | VALUE | DESCRIPTION |
|---|---|---|
| RECORD ID | BC TRANSACTION ID | |
| USER ID | BC USER ID | BLOCKCHAIN USER ID OF ANALYSIS BUSINESS OPERATOR |
| ANALYSIS YEAR/MONTH/DATE | YYYY/MM/DD | |
| PERSONAL CONSENT | CONSENT ID OR LIST | PERSONAL ID, DATA TYPE, AND DATA ITEM CAN BE IDENTIFIED |
| ANALYZER | ANALYZER ID | NAME, ADDRESS, AND REPRESENTATIVE CAN BE IDENTIFIED |
| DATA ITEM | DATA TYPE ID | |
| ASSOCIATION DATA VERIFICATION VALUE | HASH VALUE OF ANALYSIS ASSOCIATION DATA | |
| ANALYTICAL DATA VERIFICATION VALUE | HASH VALUE OF ANALYSIS RESULT DATA ASSIGNED MANAGEMENT IDENTIFIER | |
| PREVIOUS BLOCK VERIFICATION VALUE | HASH VALUE OF PREVIOUS BLOCK | |
| DIGITAL SIGNATURE | DIGITAL SIGNATURE | DIGITAL SIGNATURE GENERATED WITH BC PRIVATE KEY OF ANALYSIS BUSINESS OPERATOR (BC USER) IDENTIFIED BY BC USER ID |

FIG. 18

INFORMATION PROCESSING METHOD, INFORMATION PROCESSING SYSTEM, AND NON-TRANSITORY COMPUTER READABLE MEDIUM

CROSS REFERENCE TO RELATED APPLICATIONS

This application is based upon and claims the benefit of priority from the prior Japanese Patent Application No. 2020-186064, filed on Nov. 6, 2020, the entire contents of which are incorporated herein by reference.

FIELD

Embodiments described herein relate to an information processing method, an information processing system, and a non-transitory computer readable medium.

BACKGROUND

A method using a blockchain has been known as a method of verifying whether data recorded in a storage has been falsified or not. When the data is recorded in the storage, a hash value of the recorded data is recorded in the blockchain. When the data is read from the storage, the hash value of the read data is compared with the hash value recorded in the blockchain. It is thus verified whether the data recorded in the storage has been falsified or not.

The data includes identification information (e.g., identification information capable of identifying a person) about the data. There is a method of performing pseudonymization that changes the identification information to identification information for management, and storing the pseudonymized data in a storage. Use of this method can verification presence or absence of falsification of data pseudonymized by the technology described above. However, a scheme is required that can correctly manage the relationship between the identification information for management and the original identification information.

BRIEF DESCRIPTION OF THE DRAWINGS

FIG. 5 shows an example of data reception record information generated by a record processor;

FIG. 6 shows an example of a block to be added to the blockchain;

FIG. 11 shows an example of data analysis record information generated by a record processor;

FIG. 12 shows an example of a block to be added to the blockchain;

FIG. 17 shows an example of data analysis record information according to a modified example 3;

FIG. 18 shows an example of a block to be added to the blockchain; and

DETAILED DESCRIPTION

Figure 1:
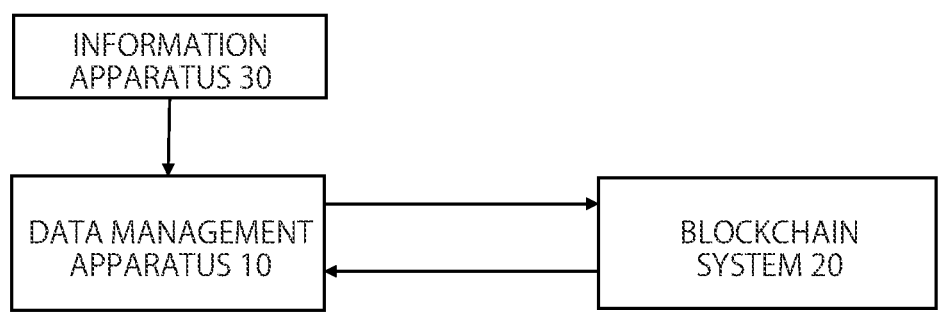
FIG. 1 is a block diagram showing a configuration example of a data management system according to a first embodiment.

According to one embodiment, an information processing method performed by a computer includes receiving a holding request that includes target data and first identification information regarding the target data to generate second identification information different from the first identification information; generating first pseudonymized data that includes the second identification information and the target data, and holding the first pseudonymized data in a first hardware holding device; generating first pseudonymous association data that associates the first identification information with the second identification information, and storing the first pseudonymous association data in a first hardware storage; calculating a first value by an operation based on the first pseudonymous association data; and providing first record information for a storage system, the storage system being configured to store the first record information, the first record information including the first value and including first information based on the first identification information.

Hereinafter, referring to the drawings, embodiments of the present invention are described.

First Embodiment

FIG. 1 is a block diagram showing a configuration example of a data management system that is an information processing system according to a first embodiment. The data management system in FIG. 1 includes a data management apparatus 10 that is an information processing apparatus according to this embodiment, a blockchain system 20, and an information apparatus 30. The data management apparatus 10 converts identification information on data that has been received from the information apparatus 30 via a communication network and serves as a target, into identification information for management, and holds the converted information, and manages the relationship between the identification information and the converted identification information. The blockchain system 20 records information or data for verifying whether data and the relationship held in the data management apparatus 10 has been falsified or not. The data management apparatus 10 and the blockchain system 20 can safely communicate with each other via the communication network. Various technologies, such as SSL/TLS and IPsec, have been known as technologies achieving safe communication that prevents data eavesdropping on a communication path, and detect data falsification. The information apparatus 30 is an apparatus managed by any business operator or person. Only one information apparatus 30 is shown in the diagram. Alternatively a plurality of information apparatuses 30 may be provided.

Each communication network may be a wide area network such as the Internet or a mobile network, a local area network such as an Ethernet or a wireless LAN, or a cable such as a serial communication cable. The data management apparatus 10 may be, for example, a computer that includes a processor (processing circuitry), such as a CPU, and a memory.

The blockchain system 20 is a system that manages a blockchain synchronously among nodes (terminals); the blockchain has a data structure that couples blocks that each include one or more transactions including information, on a time-series basis. The blockchain has characteristics that the information recorded in the blocks is difficult to be falsified. Various methods of achieving blockchain systems have been known. However, this embodiment may use any method.

The blockchain system 20 is an example of a system that stores information or data. Instead of the blockchain system 20, a database may be used. The blockchain system 20 and the database are examples of a storage system.

Figure 2:
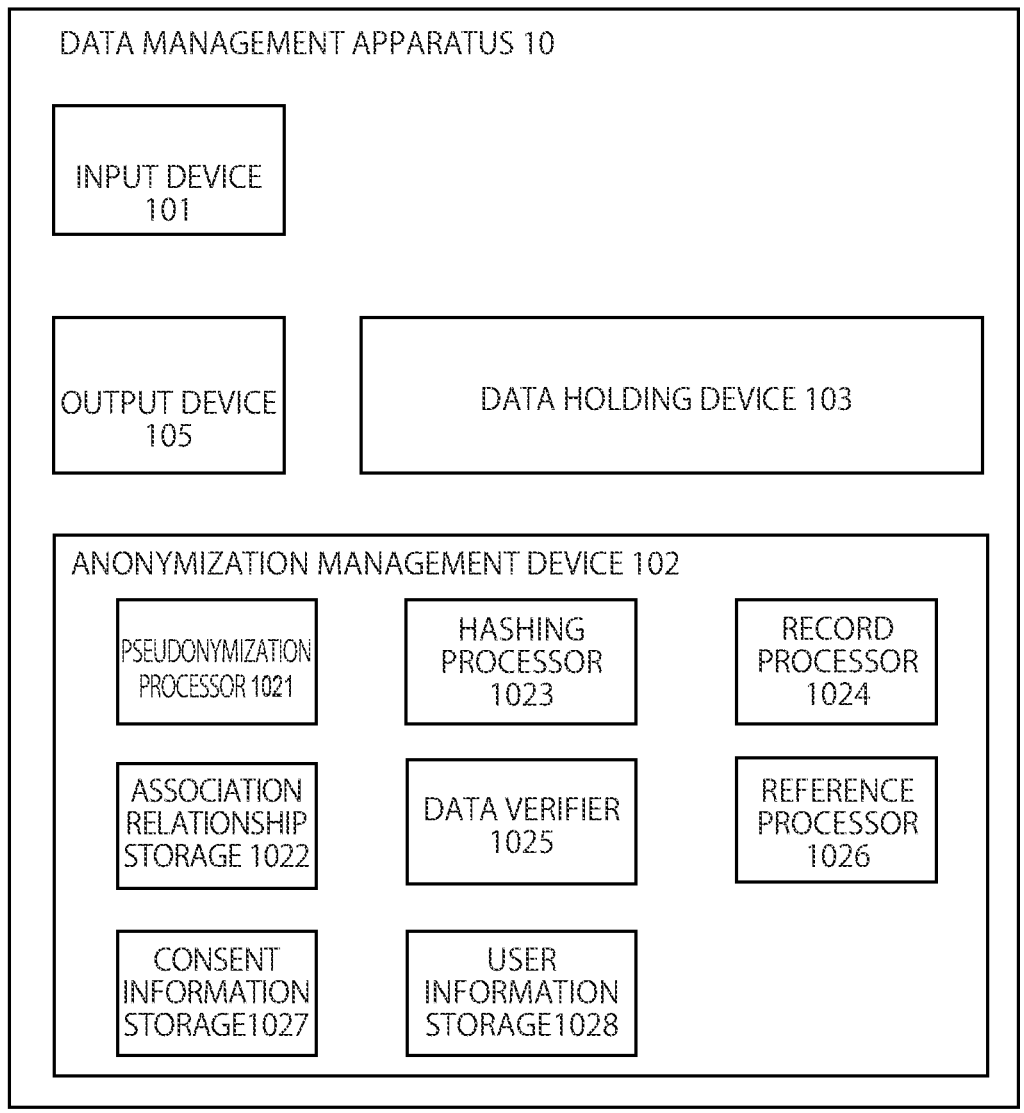
FIG. 2 is a functional block diagram of a data management apparatus according to the first embodiment.

FIG. 2 is a functional block diagram of the data management apparatus 10 according to the first embodiment. The data management apparatus 10 in FIG. 2 includes an input device 101, an anonymization management device 102, a data holding device (hardware holding storage) 103, and an output device 105. A business operator (a holding business operator or a holding institution) of the data management apparatus obtains, from another holding business operator, personal data possessed by the other holding business operator, or obtains personal data from a person, and holds the obtained personal data. Provided that the business operator of the data management apparatus is a certain company, the other holding business operator is an institution or an organization, such as a health insurance society, a medical institution or an insurance company.

The input device 101 receives a data holding request issued by the information apparatus 30. The data holding request includes the personal data, and personal information that identifies the business operator (provider) that is a data holding requester.

The personal data includes target data to be held, identification information about the target data (first identification information), and information on a data item (attribute) of the target data. The identification information about the target data is, for example, personal identification information on a person who is an owner of the target data. This embodiment assumes a case where the identification information about the target data is the personal identification information. However, there is no limitation thereto. For example, the information may be identification information on a group or an organization, or identification information on a file directory to which the target data has belonged.

The provider information includes a business operator name (provider name), and a provider ID. The provider indicated by the provider information is not limited to the business operator, and may be a person.

The data holding request may include other information. For example, information on data items included in the personal identification information may be included.

Upon receipt of the data holding request, the input device 101 transmits the data holding request to the anonymization management device 102.

The pseudonymization processor (processing circuitry) 1021 of the anonymization management device 102 applies a pseudonymization process to the personal data included in the data holding request, and generates pseudonymized data (first pseudonymized data), and pseudonymous association data (first pseudonymous association data).

Specifically, the pseudonymization processor 1021 generates a management identifier (second identification information) that is identification information for management different from the personal identification information, with respect to the personal data. The method of generating the management identifier may be any method. For example, the management identifier may be generated based on a value that is incremented by a certain value in a counter. Alternatively, the management identifier may be generated by a random number. The random number may be generated by a function that receives, as an input, the personal data, the personal identification information or the like. Alternatively, the random number may be generated by another method.

The pseudonymization processor 1021 generates the pseudonymous association data (first pseudonymous association data) by associating the generated management identifier with the personal identification information included in the personal data. The generated pseudonymous association data is transmitted to an association relationship storage (hardware storage device) 1022. The association relationship storage 1022 stores the pseudonymous association data in a pseudonymous association table in the association relationship storage 1022.

The pseudonymization processor 1021 generates the pseudonymized data (first pseudonymized data) by associating the generated management identifier with the target data included in the personal data. The pseudonymized data is transmitted to the data holding device 103. The data holding device 103 stores the pseudonymized data in an internal pseudonymization table. The data holding device 103 corresponds to the first hardware holding device that stores or holds the pseudonymized data.

The anonymization management device 102 obtains a blockchain user ID (BC user ID) of the personal user, from the blockchain system, for the personal identification information (e.g., the name or the like). The anonymization management device 102 stores the personal identification information and the blockchain user ID (BC user ID), as a set, in a user table of a user information storage 1028. The BC user ID is an ID for management in a blockchain, and is an ID of the personal user of the holding business operator (a person who puts the personal data in the holding business operator of this apparatus 10, or a person who puts the personal data in another holding business operator). The BC user ID is an ID unique to each personal user. In a case where the BC user ID has already been in the user table, the BC user ID is not required to be newly obtained. Alternatively, the user table may be preliminarily held where the personal identification information and the blockchain user ID (BC user ID) are associated with each other. In this case, the BC user ID is not required to be obtained.

An example of the pseudonymization process by the pseudonymization processor 1021 is described with reference to FIG. 3.

Figure 3:
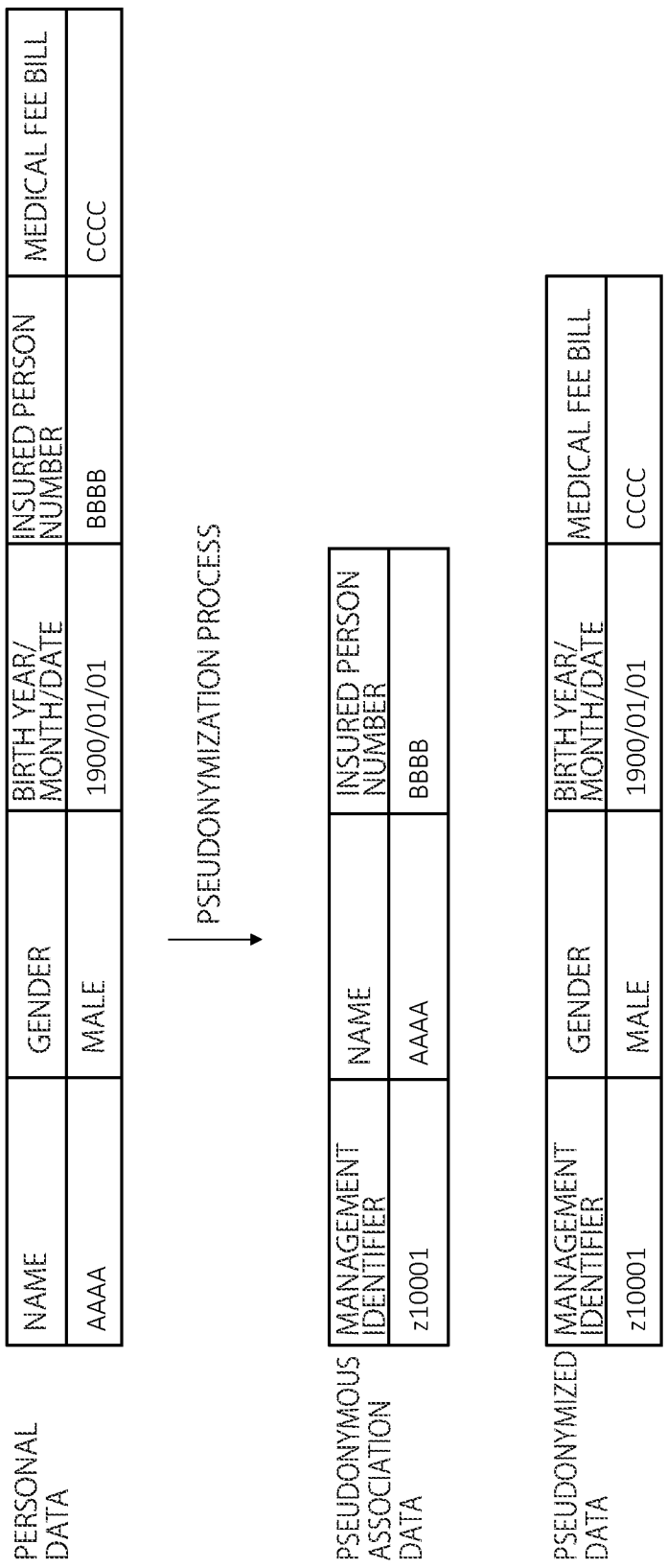
FIG. 3 shows an example of pseudonymous association data and pseudonymized data.

FIG. 3 shows an example of the personal data included in the data holding request, and the pseudonymous association data and the pseudonymized data generated by the pseudonymization process applied to the personal data.

The personal data in FIG. 3 includes: a plurality of data items that are the name, gender, birth year/month/date, insured person number, and medical fee bill; and the values of the respective data items that are "AAAA", "MALE", "1900/01/01", "BBBB" and "CCCC". The name and the insured person number are privacy information that can identify the person, and correspond to the personal identification information. The gender, the insured person number, and the medical fee bill correspond to the target data to be held. In the example in the diagram, the data items are shown in text. Alternatively, information on the data items included in the data holding request may be represented as data item IDs that represent the types of the data items.

The pseudonymization processor 1021 generates the management identifier, for the personal data. In the example in the diagram, the management identifier "z10001" is generated for the set of the name "AAAA" and the insured person number "BBBB".

The pseudonymization processor 1021 generates the pseudonymous association data by associating the generated management identifier with the name and the insured person number. The pseudonymous association data shown in FIG. 3 includes the management identifier "z10001", the name "AAAA" and the insured person number "BBBB".

The pseudonymization processor 1021 associates the management identifier with the target data (the gender, year/month/date, and medical fee bill) included in the personal data, and generates the pseudonymized data. The pseudonymized data shown in FIG. 3 includes the management identifier "z10001", the gender "MALE", the year/month/date "1900/01/01" and the medical fee bill "CCCC".

The management identifier included in the pseudonymized data is the same as the management identifier included in the pseudonymous association data. The original personal data can be restored by using both the pseudonymized data and the pseudonymous association data.

Another example of the pseudonymization process by the pseudonymization processor 1021 is described with reference to FIG. 4.

Figure 4:
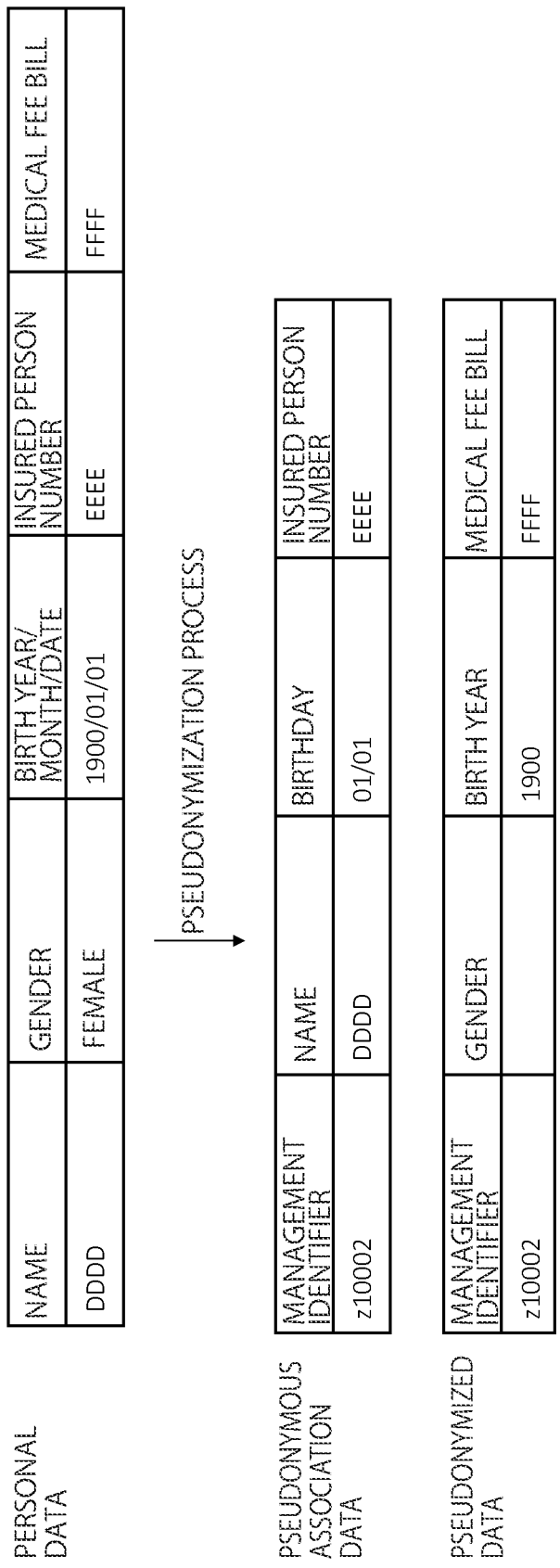
FIG. 4 shows another example of pseudonymous association data and pseudonymized data.

FIG. 4 shows an example of the personal data, and the pseudonymous association data and the pseudonymized data and generated by the pseudonymization process applied to the personal data.

The personal data shown in FIG. 4 includes the name, gender, birth year/month/date, insured person number, and medical checkup result. The name, the birthday (month/date of birth year/month/date), and the insured person number are privacy information that can identify the person, and correspond to the personal identification information. The gender, the birth year, and the medical checkup result correspond to the target data to be held.

The pseudonymization processor 1021 generates the management identifier for the personal data, and generates the pseudonymous association data by associating the generated management identifier with the personal identification information included in the personal data. The pseudonymous association data shown at the middle of FIG. 4 includes the management identifier "z10002", the name "DDDD", the birthday "01/01" and the insured person number "EEEE".

The pseudonymization processor 1021 generates the pseudonymized data by associating the generated management identifier with the target data included in the personal data. The pseudonymized data shown in FIG. 4 includes the management identifier "z10002", the gender "FEMALE", the birth year "1900" and the medical checkup result "FFFF".

The management identifier included in the pseudonymized data is the same as the management identifier included in the pseudonymous association data. The original personal data can be restored by using both the pseudonymized data and the pseudonymous association data.

The anonymization processes shown in FIGS. 3 and 4 are only examples. The method is not limited to the methods exemplified in FIGS. 3 and 4. Likewise, the format of the personal data is not limited to the examples in FIGS. 3 and 4. There is no limitation, by a specific method, on which part of data included in the personal data corresponds to the personal identification information.

The pseudonymization processor 1021 transmits the pseudonymous association data (first pseudonymous association data) to the association relationship storage 1022. The pseudonymization processor 1021 transmits the pseudonymized data to the data holding device 103. The pseudonymization processor 1021 transmits the pseudonymous association data and the pseudonymized data to a hashing processor (processing circuitry) 1023.

A consent information storage (hardware storage device) 1027 holds a consent information table that includes consent information on each person who is the owner of the personal data. The consent information is information that includes presence or absence about consent by the person pertaining to reception (receipt), possessing (holding or keeping), analysis and the like in an integrated manner. The consent information includes, for example, the consent ID, signer ID, year/month/date, personal ID (personal BC user ID), receiver ID (BC user ID of the receiver), data item, availability of consent of reception by the receiver, provider ID (BC user ID of the provider), purpose of use of the receiver, availability of consent of use by the receiver, and availability of consent of possessing (holding or keeping) by the receiver. The receiver is the business operator of the data management apparatus 10. The provider is the business operator having transmitted the data holding request (possibly a person). The availability of consent "CONSENT" means that the person consents, while "WITHDRAWAL" means that they do not consent (for example, they once consented but subsequently has withdrawn). "USE" means that the personal data is used for analysis, or is provided for a third party.

The data holding device 103 stores the pseudonymized data generated by the pseudonymization processor 1021 in the internal pseudonymization table. The pseudonymized data is held subject to the fact that it is confirmed that a person who is the owner of the personal data consents to holding of the personal data; the confirmation is based on the consent information on this person. In this case, the personal ID (BC user ID of the person) is identified from the personal identification information included in the data holding request on the basis of the user table described above. The coinciding consent information is obtained based on the personal ID. The personal identification information may include the personal ID. In this case, the personal ID included in the personal identification information may be used.

The association relationship storage 1022 stores the pseudonymous association data received from the pseudonymization processor 1021, in the internal pseudonymous association table. Similar to the case of holding the pseudonymized data, the pseudonymous association data may be held subject to the fact that it is confirmed that the person who is the owner of the personal data consents to holding of the personal data; the confirmation is based on the consent information on this person. The association relationship storage 1022 may be any recording medium, such as a memory, hardware or an optical device. The association relationship storage 1022 and the data holding device 103 may be the same recording medium. The association relationship storage 1022 corresponds to a first hardware storage that stores or holds the pseudonymous association data.

The hashing processor 1023 calculates the hash value of the pseudonymous association data (a first value based on the pseudonymous association data) by an operation based on the pseudonymous association data. That is, the pseudonymous association data is supplied as an input to a hash function, and the hash value of the pseudonymous association data as the output of the hash function. The hash value (first value) of the pseudonymous association data is information for verifying whether the pseudonymous association data has been falsified or not. The hash value can be calculated by applying a cryptographic hash function to the pseudonymous association data. The hash value is only an example. Alternatively, another value may be calculated only if the value is according to an operation based on the pseudonymous association data. In this case, a function having unpredictable output values, a one-way function, or a pseudorandom number generator may be used.

The hashing processor 1023 calculates the hash value of the pseudonymized data (a second value based on the pseudonymized data) by an operation based on the pseudonymized data. That is, the pseudonymized data is supplied as an input to a hash function, and the hash value of the pseudonymized data is obtained as the output of the hash function. The hash value of the pseudonymized data (second value) is information for verifying whether the pseudonymized data has been falsified or not. The hash value can be calculated by applying a cryptographic hash function to the pseudonymized data. The hash value is only an example. Alternatively, another value may be calculated only if the value is according to an operation based on the pseudonymized data. In this case, a function having unpredictable output values, a one-way function, or a pseudorandom number generator may be used.

A record processor (processing circuitry) 1024 generates data reception record information (first record information) that includes the receipt year/month/date, consent ID, provider ID, data items of target data, hash value of pseudonymous association data, and hash value of pseudonymized data. The consent ID uses the consent ID included in the consent information used for determining the availability of holding the pseudonymized data. The consent ID is an example of the first information corresponding to the personal identification information. The receipt year/month/date may be the year/month/date included in the data holding request, or the year/month/date when the data holding request was received. Other items other than the items described above may be added to the data reception record information.

FIG. 5 shows an example of the data reception record information generated by the record processor 1024. The data reception record information shown in the diagram includes the receipt year/month/date, consent ID, provider ID, data item ID (data type ID), hash value of pseudonymous association data (association data verification value), and hash value of pseudonymized data (pseudonymized data verification value). The provider ID is associated with the name, address, and representative (business operator).

The record processor 1024 generates a transaction that includes the generated data reception record information. The record processor 1024 transmits, to the blockchain system 20, request information for a request to add a transaction to a block. The blockchain system 20 generates a block that includes the transaction (data reception record information) indicated by the request information, and adds the generated block as a new block to a blockchain. Alternatively, the record processor 1024 may transmit, to the blockchain system 20, request information for a request to generate a block that includes the transaction, and to add the block as a new block.

FIG. 6 shows an example of a block generated by the record processor 1024 or the blockchain system 20. The transaction includes the data reception record information, information that identifies the transaction (a BC transaction ID or a record ID), and the BC user ID of the holding business operator. The transaction ID is obtained by querying a management server of the blockchain system 20. The transaction further includes a digital signature generated with a BC private key associated with the holding business operator (user of BC) identified by the BC user ID. The block generated by the record processor 1024 or the blockchain system 20 includes the hash value of the previous block in the blockchain, as a previous block verification value.

The record processor 1024 receives, from the blockchain system 20, response information indicating reception of the transaction or addition of the block. After receipt of the response information, the output device 105 transmits information for notification about completion of data holding, to the information apparatus 30, which is the originator of the data holding request.

The input device 101 receives, from the information apparatus 30, a verification request for target data (data verification request). The data verification request is a request to confirm whether the target data held in the data management apparatus 10 has not been falsified or not. The data verification request includes verification target identification information as information for identifying the target data. The verification target identification information includes, for example, personal identification information about the target data. Furthermore, the verification target identification information may include information (provider ID) for identifying the business operator (the business operator having issued the request for holding the target data) having provided the target data for the data management apparatus, or the ID of the business operator (analysis requester ID) that is the originator of the verification request. Upon receipt of the data verification request, the input device 101 transmits the received data verification request to the anonymization management device 102.

Note that the business operator having issued the data verification request, and the business operator having issued the request for holding the target data may be identical to or different from each other. That is, even if the information apparatus 30 having transmitted the data verification request and the information apparatus 30 having transmitted the data holding request are apparatuses of the same business operator or apparatuses of business operators different from each other. The business operator that issues the verification request may be an audit institution that performs audits, or a business operator that requests data holding.

A reference processor (processing circuitry) 1026 of the anonymization management device 102 obtains the data reception record information from the blockchain system 20 on the basis of the verification target identification information (personal identification information in this case) included in the data verification request.

Specifically, the reference processor 1026 obtains the pseudonymous association data that includes the personal identification information from the pseudonymous association table of the association relationship storage 1022. The verification target identification information includes, for example, the data items and values of the name and insured person number of the person. The number of data items may be one. In the example in FIG. 3 described above, when the verification target identification information designates the name "AAAA" and the insured person number "BBBB", the pseudonymous association data that includes a set of "AAAA" and "BBBB" is obtained as the data items thereon. The verification target identification information may designate pieces of personal identification information as many as the number of people, or designate pieces of personal identification information for each person. The insured person number may be designated by a range of values. The verification target identification information may designate a set of the name, birthday, and insured person number, or at least one of these three values (see FIG. 4). The birthday may be designated by a range of values.

The reference processor 1026 identifies the management identifier included in the obtained pseudonymous association data, and obtains the pseudonymized data that includes the management identifier from the pseudonymization table of the data holding device 103. The data items of the target data included in the obtained pseudonymized data are then identified. In the example in FIG. 3 described above, when the pseudonymous association data that includes the set of "AAAA" and "BBBB" is obtained, "z10001" included in the pseudonymous association data is identified, and the pseudonymized data that includes "z10001" (the pseudonymized data indicated at the bottom of FIG. 3) is obtained. The gender, birth year/month/date, and medical fee bill are identified as data items included in the obtained pseudonymized data.

Note that if there are a plurality of pieces of pseudonymous association data including the set of "AAAA" and "BBBB", the management identifier may be identified on the basis of each of the pieces of pseudonymous association data. With respect to each of the identified management identifiers, the pseudonymized data may be obtained and the data item of the target data may be identified.

The reference processor 1026 of the anonymization management device 102 obtains the BC user ID associated with the personal identification information (name and the like) included in the data verification request, from the user table of the user information storage 1028. The consent information that includes the obtained BC user ID as the personal ID is obtained from the consent information table of the consent information storage 1027, and the consent ID included in the obtained consent information is identified.

The reference processor 1026 transmits, to the blockchain system 20, the request information for a request to retrieve (obtain) the data reception record information, on the basis of the identified consent ID and the data items obtained as described above.

The blockchain system 20 identifies the transaction that includes the consent ID and data items included in the request information. The blockchain system 20 transmits the identified transaction to the data management apparatus 10.

Upon receipt of the transaction from the blockchain system 20, the reference processor 1026 verifies the digital signature, and confirms that the data reception record information included in the transaction has been fairly created. The reference processor 1026 passes the data reception record information to a data verifier 1025.

The data verifier 1025 obtains the aforementioned pseudonymous association data and pseudonymized data obtained by the reference processor 1026, causes the hashing processor 1023 to calculate the hash value of the pseudonymous association data and the hash value of the pseudonymized data, and obtains the calculated values.

The data verifier 1025 verifies whether the hash value of the obtained pseudonymous association data and the hash value of the obtained pseudonymized data coincide with the hash value of the pseudonymous association data and the hash value of the pseudonymized data included in the data reception record information (falsification verification). That is, based on whether both coincide, presence or absence (validity) of falsification of at least one of the personal identification information and the target data held in the data management apparatus 10 is determined.

If both coincide, it is determined that the pseudonymous association data and the pseudonymized data have not been falsified. That is, it is determined that the personal data (the personal identification information and the target data) has not been falsified.

If any one does not coincide, it may be determined that the personal data has been falsified. Specifically, if the hash values of the pseudonymous association data do not coincide with each other, it may be determined that the pseudonymous association data or the personal identification information has been falsified. If the hash values of the pseudonymized data do not coincide with each other, it may be determined that the pseudonymized data or the target data has been falsified.

When a plurality of transactions are received from the blockchain system 20, the falsification verification based on the hash value of the pseudonymous association data and the hash value of the pseudonymized data is performed for every received transaction. If the hash values identical to the hash values obtained by the hashing processor 1023 are included in any of the transactions, it is determined that the pseudonymous association data and the pseudonymized data have not been falsified.

The output device 105 transmits result information on the falsification verification to the information apparatus 30, which is the originator of the data verification request.

Figure 7:
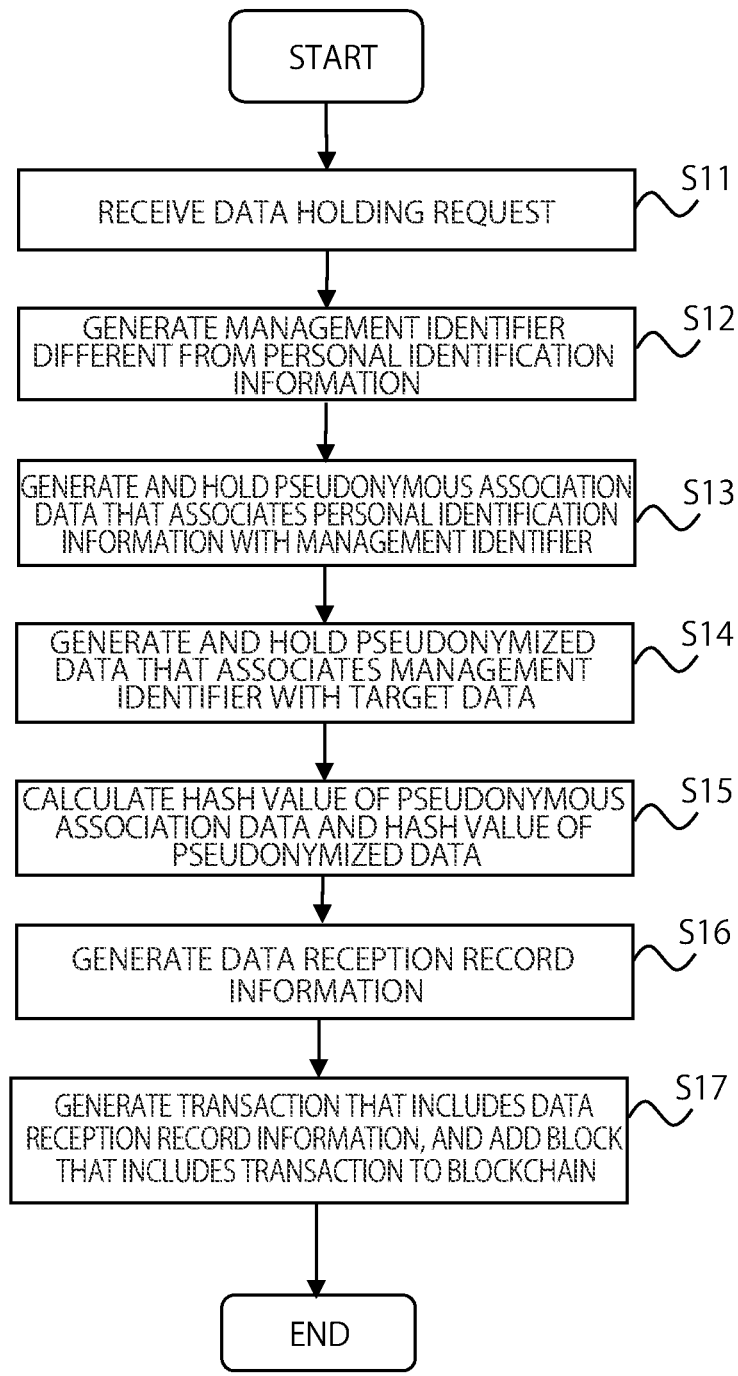
FIG. 7 is a flowchart showing an example of an operation of the data management apparatus.

FIG. 7 is a flowchart showing an example of the operations of the data management apparatus 10 and the blockchain system 20 when the input device 101 receives a request to hold the target data (data holding request) issued by the information apparatus 30.

The input device 101 receives the data holding request issued by the information apparatus 30 (S11). The data holding request includes, for example, the personal data, and information (provider ID etc.) that identifies the business operator (provider) that is a data holding requester. The personal data includes personal identification information (first identification information) that can identifies each person, the target data to be held, and information on the data items of the target data.

The pseudonymization processor 1021 of the anonymization management device 102 applies a pseudonymization process to the personal data included in the data holding request, and generates pseudonymized data (first pseudonymized data), and pseudonymous association data (first pseudonymous association data) (S12 to S15). Specifically, the anonymization management device 102 obtains the blockchain user ID (BC user ID) of the personal user with respect to the personal identification information (e.g., the name etc.), holds the personal identification information and the BC user ID, as a set, in the user table of the data holding device 103. The consent information that includes the BC user ID is obtained from the consent information table, and confirms the consent about the personal data ownership (keeping) of the personal data. The pseudonymization processor 1021 generates a management identifier (second identification information) that is identification information different from the personal identification information, with respect to the personal data (S12). The pseudonymization processor 1021 generates the pseudonymous association data (first pseudonymous association data) by associating the generated management identifier with the personal identification information included in the personal data, and holds the data in an association relationship table in the association relationship storage 1022 (S13). The pseudonymization processor 1021 generates the pseudonymized data (first pseudonymized data) by associating the generated management identifier with the target data included in the personal data, and holds the data in the pseudonymization table in the data holding device 103 (S14).

The hashing processor 1023 of the anonymization management device 102 calculates the hash value of the pseudonymous association data (the first value based on the pseudonymous association data) (S15). The hashing processor 1023 calculates the hash value of the pseudonymized data (the second value based on the pseudonymized data) (the same S15).

A record processor (processing circuitry) 1024 generates data reception record information that includes the receipt year/month/date, consent ID, provider ID, data items of target data, hash value of pseudonymous association data, and hash value of pseudonymized data (S16).

The record processor 1024 generates a transaction that includes the generated data reception record information, the BC transaction ID, the BC user ID, and the digital signature, or generates a block that includes the transaction (S17). The record processor 1024 transmits, to the blockchain system 20, request information to add the transaction to the block or to add the generated block (the same S17). The blockchain system 20 adds the block that includes the transaction to the blockchain on the basis of the request information (the same S17).

Figure 8:
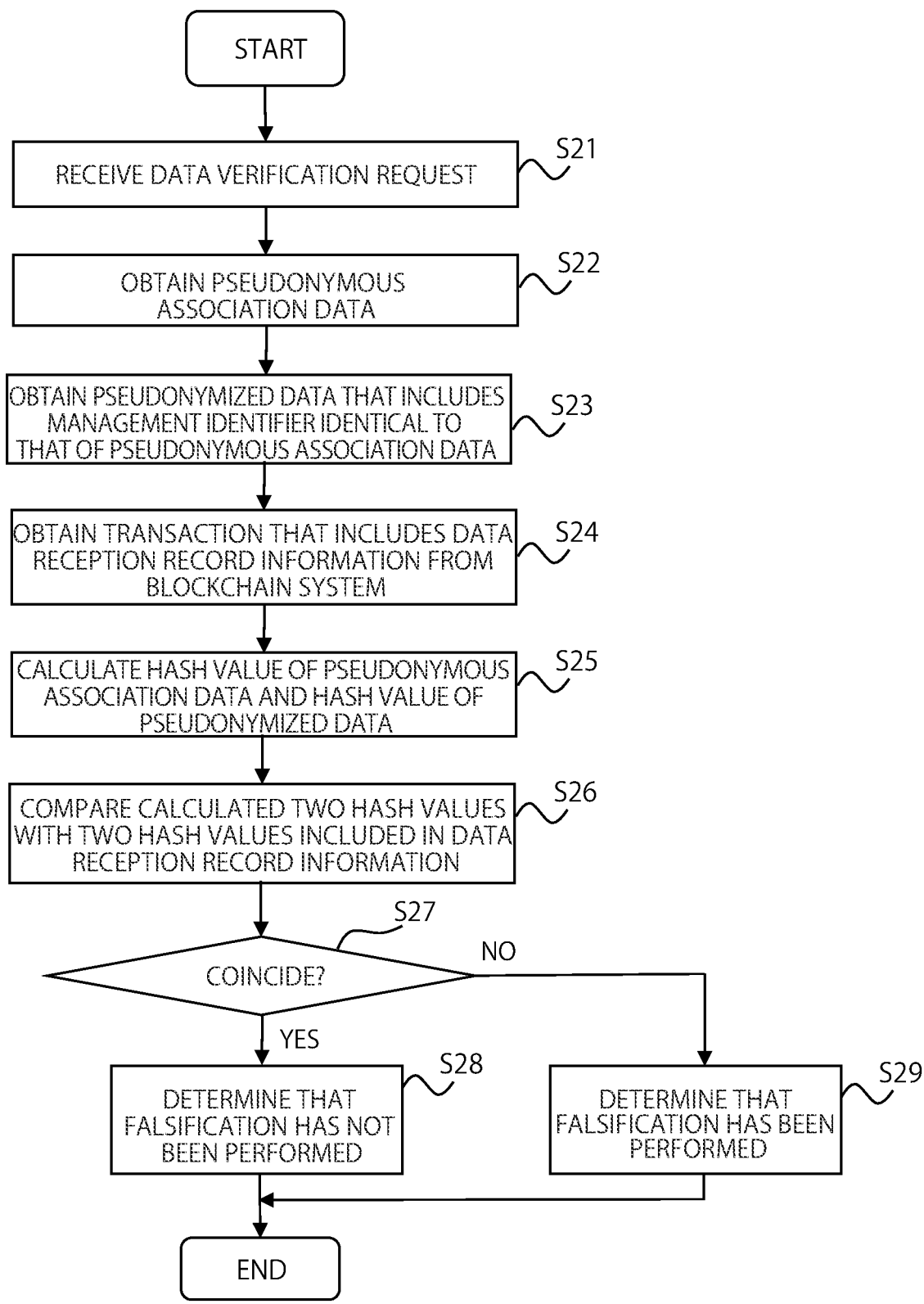
FIG. 8 is a flowchart showing another example of an operation of the data management apparatus.

FIG. 8 is a flowchart showing an example of the operations of the data management apparatus 10 and the blockchain system 20 when the input device 101 receives a request to verify the target data (data verification request) issued by the information apparatus 30.

The input device 101 receives, from the information apparatus 30, a verification request for target data (data verification request) (S21). The data verification request includes verification target identification information (personal identification information etc.) as information for identifying the target data. The verification target identification information may include information (provider ID or user ID) that identifies the business operator having provided the target data (the business operator having issued the request for holding the target data). The verification target identification information may include the ID (analysis requester ID) of the business operator, which is the originator of the verification request.

The reference processor (processing circuitry) 1026 obtains the pseudonymous association data that includes the personal identification information from the pseudonymous association table of the association relationship storage 1022 (S22). The reference processor 1026 identifies the management identifier included in the obtained pseudonymous association data, and obtains the pseudonymized data that includes the management identifier from the pseudonymization table of the data holding device 103 (S23). The data items of the target data included in the obtained pseudonymized data are then identified.

The reference processor 1026 identifies the BC user ID from the personal identification information (name etc.) included in the data verification request, on the basis of the user table, and obtains the consent information that includes the BC user ID from the consent information table. The reference processor 1026 identifies the consent ID included in the consent information, and transmits, to the blockchain system 20, the request information for a request to retrieve (obtain) the data reception record information, on the basis of the identified consent ID and the data items described above. The reference processor 1026 receives, from the blockchain system 20, the transaction retrieved on the basis of the request information (S24). The reference processor 1026 verifies the digital signature included in the transaction, and subsequently obtains the data reception record information included in the transaction.

The hashing processor 1023 calculates the hash value from the pseudonymous association data obtained as described above, and subsequently calculates the hash value from the pseudonymized data obtained as described above (S25). The data verifier 1025 verifies whether these calculated hash values coincide with the hash value of the pseudonymous association data and the hash value of the pseudonymized data included in the data reception record information (falsification verification) (S26).

If both coincide (YES in S27), it is determined that the pseudonymous association data and the pseudonymized data have not been falsified (S28). That is, it is determined that the personal data (the personal identification information and the target data) has not been falsified. If any one does not coincide (NO in S27), it is determined that the personal data has been falsified (S29). Specifically, if the hash values of the pseudonymous association data do not coincide with each other, it is determined that the pseudonymous association data or the personal identification information has been falsified. If the hash values of the pseudonymized data do not coincide with each other, it is determined that the pseudonymized data or the target data has been falsified. The output device 105 transmits result information on the falsification verification to the information apparatus 30, which is the originator of the data verification request.

Modified Example 1

In the embodiments described above, both the pseudonymized data and the pseudonymous association data are detection targets of presence or absence of falsification. Alternatively, only the pseudonymous association data may be the detection target of presence or absence of falsification. In this case, only the hash value of the pseudonymous association data may be calculated, and only the hash value of the pseudonymous association data may be stored in the data reception record information.

Modified Example 2

The consent information and the data reception record information may include the owner ID that identifies the owner (person). The owner ID may be a personal BC user ID, or another ID. In this case, the request information for a request to obtain the data reception record information may include the owner ID instead of or together with the consent ID. The owner ID may be included in at least one of the data holding request and the data verification request. At least one of the consent ID and the owner ID corresponds to an example of the first information based on the personal identification information. The consent information table and the user table in the embodiment described above are an example of first association information data that associates the personal identification information with the first information. The first information based on the personal identification information (first identification information) encompasses a case where the first information is the personal identification information itself (a case where both the first information and the personal identification information are the owner ID), and a case where the first information is associated with the personal identification information in the first association information data (a case where the personal identification information is the name or the like and the first information is the consent ID).

As described above, according to the first embodiment, when pseudonymization that changes the personal identification information associated with the target data to the management identifier is performed, the pseudonymous association data that includes the personal identification information and the management identifier is stored in the association relationship storage, and the hash value of the pseudonymous association data is recorded in the blockchain system. When it is intended to verify the validity (presence or absence of falsification) of the pseudonymous association data, the hash value is read from the blockchain system, and the hash value of the pseudonymous association data read from the association relationship storage is calculated. If the calculated hash value coincides with the hash value read from the blockchain system, it is determined that the pseudonymous association data has not been falsified. Even when the pseudonymization has thus been performed, the personal identification information on the target data can be correctly identified.

Furthermore, according to this embodiment, the pseudonymized data that associates the target data with the management identifier is stored in the data holding device, and the hash value of the pseudonymized data is recorded in the blockchain system. When it is intended to verify the validity (presence or absence of falsification) of the pseudonymized data, the hash value of the pseudonymized data is read from the blockchain system, and the hash value of the pseudonymized data read from the data holding device is calculated. If the calculated hash value coincides with the hash value read from the blockchain system, it is determined that the pseudonymized data has not been falsified. When the pseudonymization has thus been performed, the validity (presence or absence of falsification) of the target data can be determined.

Modified Example 3

It may be configured to record, in the blockchain system, the consent information that is by the person, or the owner of the personal data, and is held by the consent information storage 1027.

In this case, the reference processor 1026 of the anonymization management device 102 obtains the BC user ID associated with the personal identification information (name and the like) included in the data verification request, from the user table of the user information storage 1028. The consent information that includes the obtained BC user ID as the personal ID is obtained from the blockchain system, and the consent ID included in the obtained consent information is identified.

Second Embodiment

In the first embodiment, the mode in the case where the data management apparatus 10 receives the data holding request issued by the information apparatus 30 is described. In a second embodiment, a mode where the data analysis request is received is described.

Figure 9:
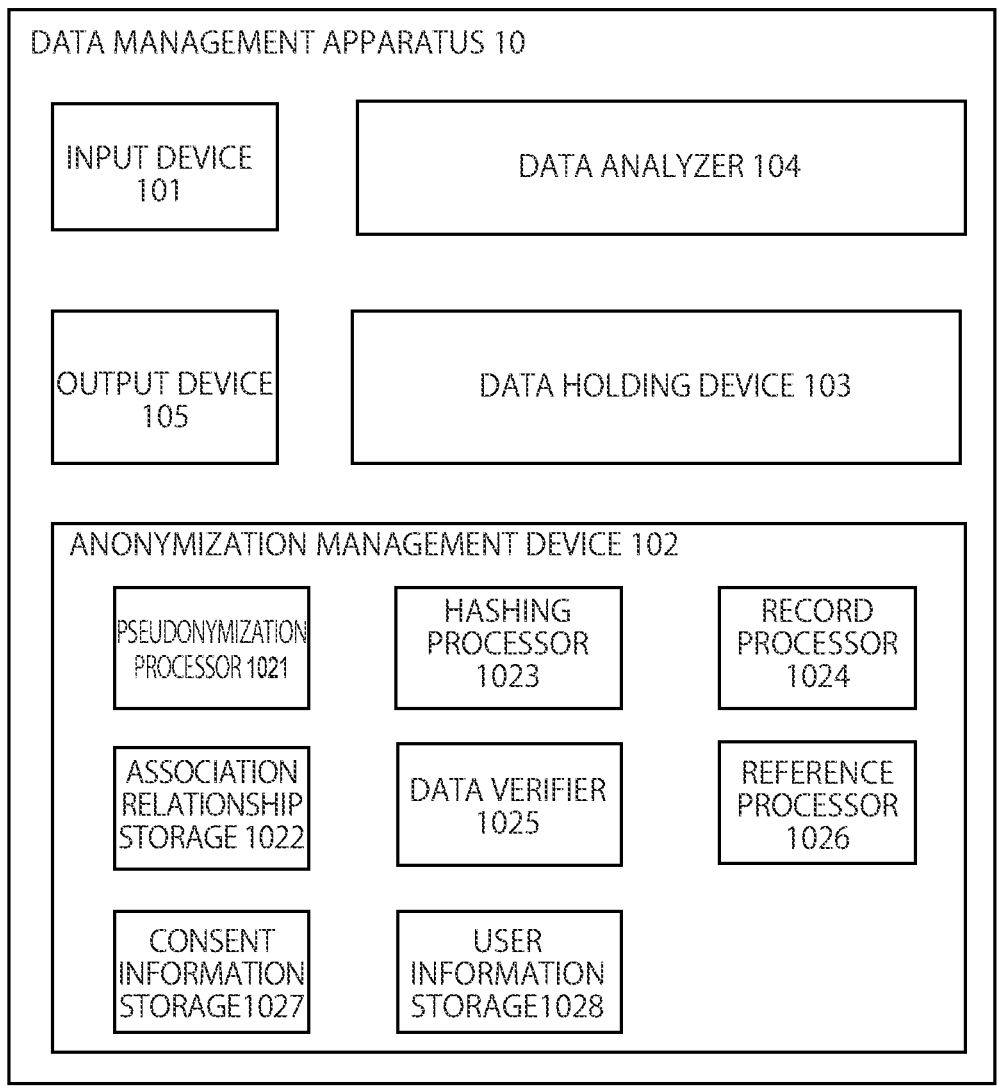
FIG. 9 is a block diagram of a data management apparatus according to a second embodiment.

FIG. 9 is a block diagram of a data management apparatus 10 according to the second embodiment. A data analyzer 104 is added to the block diagram in the first embodiment. Blocks similar to those in the first embodiment are assigned the same symbols, and description thereof is appropriately omitted. Similar to the first embodiment, various processes can be modified and extended. The description thereof is evident from the description of the first embodiment. Accordingly, the description is omitted.

The input device 101 receives a data analysis request issued by the information apparatus 30. The business operator of the information apparatus 30, that is, the business operator that is the originator of the data analysis request is an analysis request business operator. The data analysis request is a request for data analysis based on the personal data (target data). The analysis target identification information includes, for example, personal identification information that identifies a person in personal data to be used for analysis, data items to be analyzed, information that identifies the analysis method (analysis method identification information), and information (analyzer ID) that identifies the analysis business operator (the business operator of the data management apparatus in this embodiment). The analysis target identification information may include information that identifies the analysis request business operator (analysis requester ID). Upon receipt of the data analysis request, the input device 101 transmits the data analysis request to the anonymization management device 102.

The pseudonymization processor 1021 of the anonymization management device 102 obtains pseudonymized data to be analyzed, from the pseudonymization table of the data holding device 103, on the basis of the analysis target identification information included in the data analysis request. The pseudonymization processor 1021 transmits the obtained pseudonymized data and analysis method identification information, to the data analyzer 104.

The data analyzer 104 generates analysis result data by applying an analysis process through an analysis method identified by the analysis method identification information, to the target data included in the pseudonymized data, for example, data on the data items identified by the analysis target identification information. In this case, the anonymization management device 102 obtains the BC user ID of the owner (person) of the target data to be used for analysis, from the user table of the user information storage 1028, and obtains the consent information that includes the personal BC user ID from the consent information table of the consent information storage 1027. Only when the person consents to the analysis according to the obtained consent information, the analysis process is performed.

The pseudonymization processor 1021 of the anonymization management device 102 adopts, as a temporary management identifier, the management identifier (described as a management identifier "A") included in the pseudonymized data, and generates analysis result data that is assigned the temporary management identifier and associates the temporary management identifier with the analysis result data. The new management identifier (management identifier "B") different from the temporary management identifier (management identifier "A") is generated. The temporary management identifier (management identifier "A") corresponds to privacy information that can identify the person. The method of generating the management identifier "B" may be similar to the method of generating the management identifier described in the first embodiment.

The pseudonymization processor 1021 replaces the temporary management identifier of the analysis result data assigned the temporary management identifier with the management identifier "B", thereby generating the analysis result data (second pseudonymized data) that is assigned the management identifier and associates the management identifier "B" with the analysis result data. The pseudonymization processor 1021 stores the analysis result data assigned the management identifier, in the analysis result table in the data holding device 103. The management identifier "B" corresponds to third identification information that identifies the analysis result data. The data holding device 103 corresponds to second hardware holding device that holds the second pseudonymized data.

The pseudonymization processor 1021 generates analysis association data (second pseudonymous association data) that associates the management identifier "B" with the management identifier "A". The pseudonymization processor 1021 stores the analysis association data in the analysis association table in the association relationship storage 1022. The association relationship storage 1022 corresponds to a second hardware storage that stores the second pseudonymous association data.

An example of the pseudonymization process by the pseudonymization processor 1021 is described with reference to FIG. 10.

Figure 10:
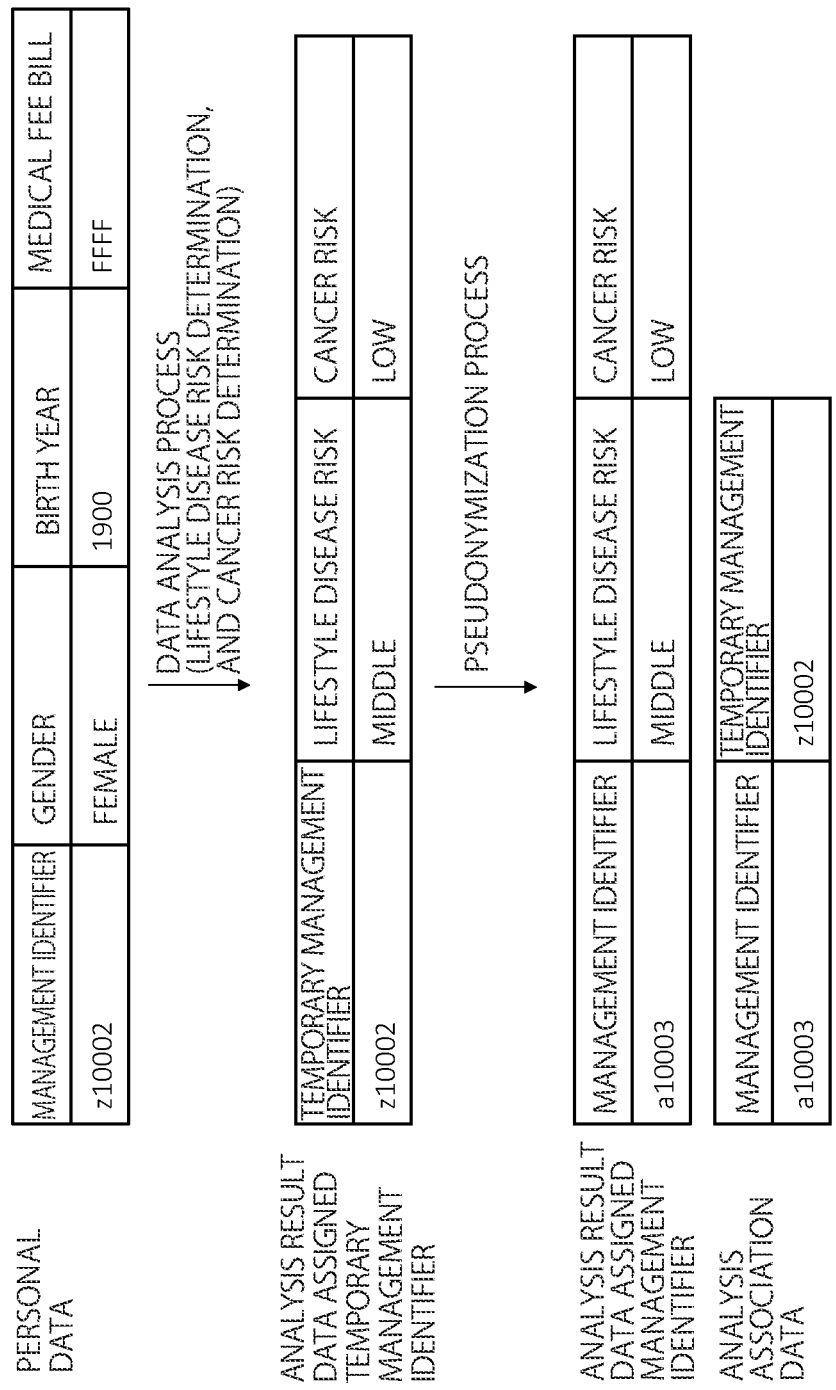
FIG. 10 is a diagram for illustrating an example of a pseudonymization process by a pseudonymization processor.

FIG. 10 is a diagram for illustrating an example of the pseudonymization process by the pseudonymization processor 1021. The analysis result data is generated by applying data analysis to the data items included in the pseudonymized data obtained in response to the data analysis request. The pseudonymized data includes the management identifier, gender, birth year, and medical checkup result. The management identifier "z10002" included in the pseudonymized data corresponds to the management identifier "A" described above. The data items to be analyzed are the gender, the birth year and the medical checkup result. The analysis method identification information designates a lifestyle disease risk determination method, and a cancer risk determination and analysis method. As the data analysis result, the lifestyle disease risk is "MIDDLE", and the cancer risk is "LOW". The analysis result data is generated in which "z10002" is the temporary management identifier and which is assigned the temporary management identifier and associates "z10002" with the analysis result data. The pseudonymization process newly generates a management identifier "a10003" as a management identifier "B", and associates the management identifier "a10003" with the data analysis result, thus generating the analysis result data assigned the management identifier. The management identifier "a10003" is assigned with "z10002", thus generating the analysis association data. The analysis association data is stored in the analysis association table of the association relationship storage 1022. The analysis result data assigned the management identifier is stored in the analysis result table of the data holding device 103.

The hashing processor 1023 of the anonymization management device 102 calculates the hash value of the analysis association data (a third value based on the analysis association data) by an operation based on the analysis association data. The hash value of the analysis association data is information for verifying whether the analysis association data has been falsified or not. The hash value can be calculated by applying a cryptographic hash function to the analysis association data. The hash value is only an example. Alternatively, another value may be calculated only if the value is according to an operation based on the analysis association data. In this case, a function having unpredictable output values, a one-way function, or a pseudorandom number generator may be used.

The hashing processor 1023 calculates the hash value of the analysis result data assigned the management identifier (a fourth value based on the analysis result data assigned the management identifier), by the operation based on the analysis result data assigned the management identifier. The hash value of the analysis result data assigned the management identifier is information for verifying whether the analysis result data assigned the management identifier has been falsified or not. The hash value can be calculated by applying a cryptographic hash function to the analysis result data assigned the management identifier. The hash value is only an example. Alternatively, another value may be calculated only if the value is according to an operation based on the analysis result data assigned the management identifier. In this case, a function having unpredictable output values, a one-way function, or a pseudorandom number generator may be used.

The record processor 1024 of the anonymization management device 102 generates data analysis record information (second record information) that includes the hash value of the analysis association data and the hash value of the analysis result data assigned the management identifier. More specifically, the record processor 1024 generates data analysis record information that includes the analysis year/month/date, consent ID, analyzer ID, data items to be analyzed (data type ID), the hash value of analysis association data, and the hash value of analysis result data assigned the management identifier. For example, the analysis year/month/date is included in the data analysis request. Other various items can be added to the data analysis record information. The consent ID is the consent ID included in the consent information used to confirm the consent of the person to the data analysis.

FIG. 11 shows an example of the data analysis record information generated by the record processor 1024. The data analysis record information shown in the diagram includes the analysis year/month/date, consent ID, analyzer ID, data item ID (data type ID), the hash value of analysis association data (association data verification value), and the hash value of analysis result data assigned the management identifier (analytical data verification value). The analyzer ID is associated with the name, address, and representative (business operator).

The record processor 1024 generates a transaction that includes the generated data analysis record information. The transaction includes the data analysis record information (see FIG. 11), information that identifies the transaction (a BC transaction ID or a record ID), and the BC user ID of the analysis business operator. The transaction further includes a digital signature generated with a BC private key of the user (analysis business operator) identified by the BC user ID. The record processor 1024 transmits, to the blockchain system 20, request information for a request to add a transaction to a block. The blockchain system 20 generates a block that includes the transaction indicated by the request information, and adds the generated block as a new block to a blockchain. Alternatively, the record processor 1024 may transmit, to the blockchain system 20, request information for a request to generate a block that includes the transaction, and to add the block as a new block.

FIG. 12 shows an example of a block generated by the record processor 1024 or the blockchain system 20. The transaction, and the hash value of the previous block (previous block verification value) are included in the block. When the record processor 1024 adds the previous block verification value, this processor obtains the previous block verification value by querying the blockchain system 20.

The input device 101 receives, from the information apparatus 30, a data verification request for analysis result data to be verified. The data verification request is a request for confirming whether the analysis result data held in the data management apparatus 10 has not been falsified or not. The data verification request includes information for identifying the analysis result data to be verified, as verification target identification information. The verification target identification information includes, for example, the data items used for data analysis and the values of the data items, and information (analyzer ID) that identifies the business operator having analyzed the target data. The verification target identification information may include personal identification information on the person of the personal data, which is the generation source of the analysis result data. The verification target identification information may include information on the method used for data analysis. Upon receipt of the data verification request, the input device 101 transmits the received data verification request to the anonymization management device 102.

Note that the business operator having issued the data verification request, and the business operator having issued the data analysis request may be identical to or different from each other. That is, even if the information apparatus 30 having transmitted the data verification request and the information apparatus 30 having transmitted the data analysis request are apparatuses of the same business operator or apparatuses of business operators different from each other.

A reference processor 1026 of the anonymization management device 102 obtains the data analysis record information from the blockchain system 20 on the basis of the verification target identification information included in the data verification request.

Specifically, the reference processor 1026 obtains the pseudonymized data that includes the data items identified by the verification target identification information and the values of the data items, from the pseudonymization table of the data holding device 103. In the example in FIG. 10 described above, when the verification target identification information designates the gender "GENDER", birth year "1900" and medical checkup result "FFFF", pseudonymized data that includes a set of "FEMALE", "1900" and "FFFF" is obtained. When the verification target identification information designates the person, pseudonymized data about this person may be obtained.

The reference processor 1026 identifies the management identifier included in the obtained pseudonymous association data, as the temporary management identifier (management identifier "A"), and obtains the analysis association data that includes the temporary management identifier, from the analysis association table of the data holding device 103. The management identifier (management identifier "B") associated with the temporary management identifier according to the analysis association data is identified. The analysis result data assigned the management identifier that includes the identified management identifier (management identifier "B") is obtained from the analysis result table of the data holding device 103. The data items of the target data included in the obtained analysis result data assigned the management identifier are identified. In the example in FIG. 10 described above, when "z10002" is identified as the temporary management identifier (management identifier "A") from the obtained pseudonymous association data, "a10003" associated with "z10002" is identified as the management identifier (management identifier "B"). The analysis result data assigned the management identifier including "a10003" is obtained. The lifestyle disease risk, and the cancer risk are identified as the data items.

The reference processor 1026 of the anonymization management device 102 obtains the BC user ID from the user table of the user information storage 1028 on the basis of the name (personal identification information) of the person of the pseudonymized data. The reference processor 1026 obtains the consent information that includes the obtained BC user ID as the personal ID from the consent information table of the consent information storage 1027, and identifies the consent ID included in the consent information.

The reference processor 1026 transmits a request information for a request to retrieve (obtain) the data analysis record information to the blockchain system 20 on the basis of the obtained consent ID and the data items described above (e.g., the lifestyle disease risk and the cancer risk).

The blockchain system 20 identifies the transaction that includes the consent ID and data items included in the request information. The blockchain system 20 transmits the identified transaction to the data management apparatus 10.

Upon receipt of the transaction from the blockchain system 20, the reference processor 1026 verifies the digital signature, and confirms that the data analysis record information included in the transaction has been fairly created. The reference processor 1026 passes the data analysis record information to a data verifier 1025.

The data verifier 1025 obtains the aforementioned analysis association data obtained by the reference processor 1026, and the analysis result data assigned the management identifier, causes the hashing processor 1023 to calculate the hash value of the analysis association data and the hash value of the analysis result data assigned the management identifier.

The data verifier 1025 verifies whether the hash value of the obtained analysis association data and the hash value of the obtained analysis result data assigned the management identifier coincide with the hash value of the analysis association data included in the data analysis record information and the hash value of the analysis result data assigned the management identifier. That is, based on whether both coincide, presence or absence (validity) of falsification of the analysis result data held in the data management apparatus 10.

If both coincide, it is determined that the analysis association data and the analysis result data assigned the management identifier have not been falsified. That is, it is determined that the analysis result data has not been falsified. If any one does not coincide, it may be determined that the analysis result data, the analysis association data or the like has been falsified. Specifically, if the hash values of the analysis association data do not coincide with each other, it is determined that the analysis association data has been falsified. If the hash values of the analysis result data assigned the management identifier do not coincide with each other, it is determined that the pseudonymized data or the analysis result data has been falsified.

The output device 105 transmits result information on the falsification verify to the information apparatus 30, which is the originator of the verification request. Note that when the consent information includes information on withdrawal of consent, the output device 105 may transmit information on withdrawal of data analysis and holding of the data analysis result.

Figure 13:
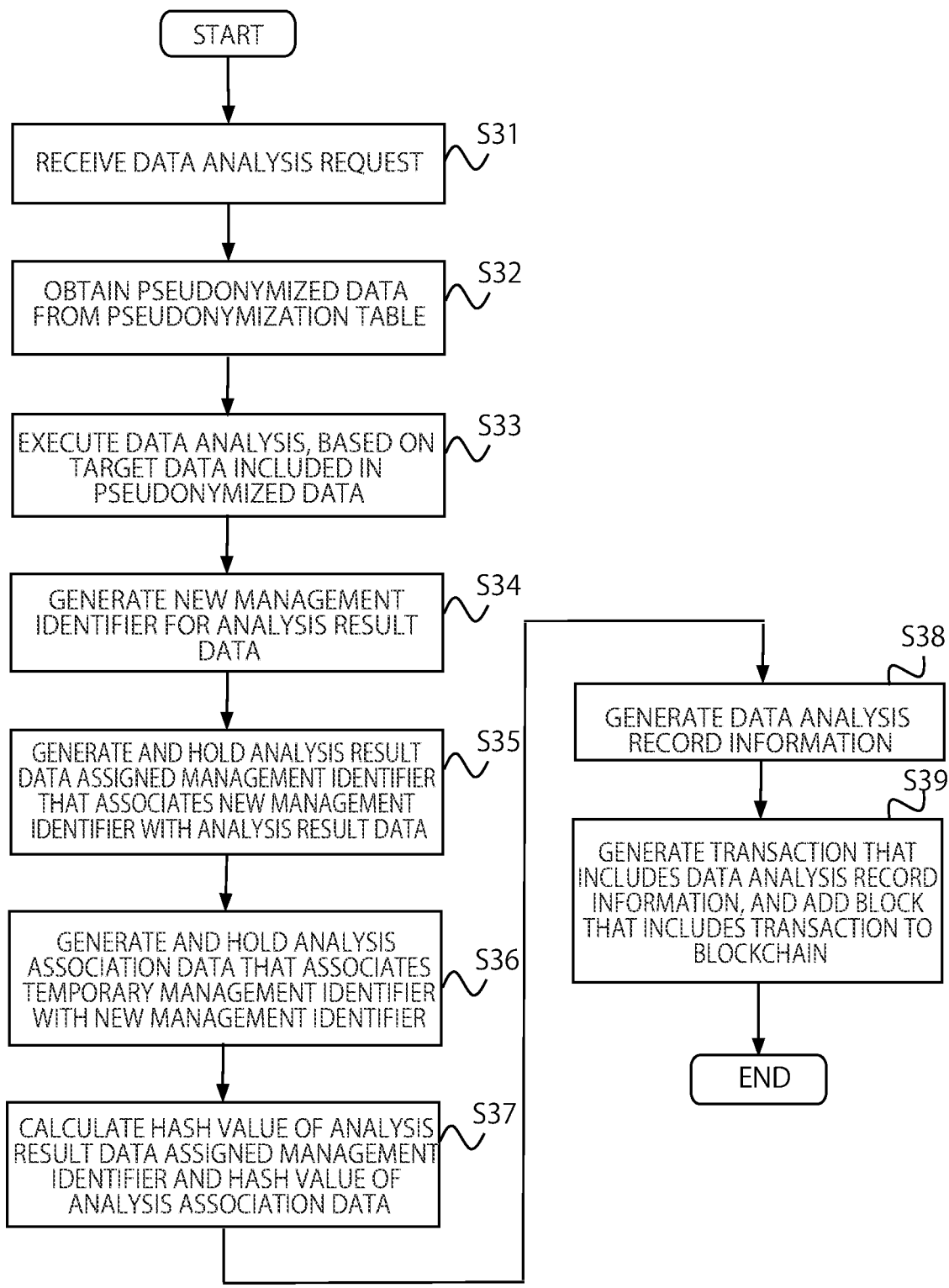
FIG. 13 is a flowchart showing an example of an operation of the data management apparatus.

FIG. 13 is a flowchart showing an example of the operations of the data management apparatus 10 and the blockchain system 20 when the input device 101 receives a data analysis request issued by the information apparatus 30.

The input device 101 receives the data analysis request issued by the information apparatus 30 (S31). The data analysis request includes information that identifies data to be analyzed (analysis target identification information). The analysis target identification information includes, for example, data items to be analyzed, information that identifies the analysis method (analysis method identification information), and information (analyzer ID) that identifies the analysis business operator (the business operator of the data management apparatus in this embodiment). The analysis target identification information may include the personal identification information that identifies the person. The analysis target identification information may include information that identifies the analysis request business operator (analysis requester ID).

The pseudonymization processor 1021 of the anonymization management device 102 obtains pseudonymized data serving as a target, from the pseudonymization table of the data holding device 103, on the basis of the analysis target identification information included in the data analysis request (S32). The pseudonymization processor 1021 transmits the obtained pseudonymized data and analysis method identification information, to the data analyzer 104.

The data analyzer 104 generates analysis result data by applying an analysis process to the target data included in the pseudonymized data, for example, data on the data items identified by the analysis target identification information (S33). In this case, the anonymization management device 102 obtains the BC user ID of the owner (person) of the target data to be used for analysis, from the user table of the user information storage 1028, and obtains the consent information that includes the personal BC user ID from the consent information table of the consent information storage 1027. Only when the person consents to the analysis according to the obtained consent information, the analysis process is performed.

The pseudonymization processor 1021 of the anonymization management device 102 adopts, as the temporary management identifier, the management identifier included in the pseudonymized data, and generates a new management identifier for the analysis result data (S34). The pseudonymization processor 1021 generates the analysis result data that is assigned the management identifier and associates the new management identifier with the analysis result data (S35). The pseudonymization processor 1021 holds the analysis result data assigned the management identifier, in the analysis result table in the data holding device 103 (the same S35). The pseudonymization processor 1021 adopts, as the temporary management identifier, the management identifier included in the pseudonymized data, and generates the analysis association data that associates the temporary management identifier with the new management identifier (S36). The pseudonymization processor 1021 holds the analysis association data in the analysis association table in the association relationship storage 1022 (the same S36).

The hashing processor 1023 of the anonymization management device 102 calculates the hash value of the analysis association data (S37). The hashing processor 1023 calculates the hash value of the analysis result data assigned the management identifier (the same S37).

The record processor 1024 generates data analysis record information that includes the analysis year/month/date, consent ID, analyzer ID, data items to be analyzed, the hash value of analysis association data, and the hash value of analysis result data assigned the management identifier (S38). The consent ID is the consent ID included in the consent information used to confirm the consent of the person to the data analysis.

The record processor 1024 generates a transaction that includes the generated data analysis record information, the BC transaction ID, the BC user ID of the analysis business operator, and the digital signature, or generates a block that includes the transaction (S39). The record processor 1024 transmits, to the blockchain system 20, request information to add the transaction to the block or to add the generated block (the same S39). The blockchain system 20 adds the block that includes this transaction to the blockchain on the basis of the request information (the same S39).

Figure 14:
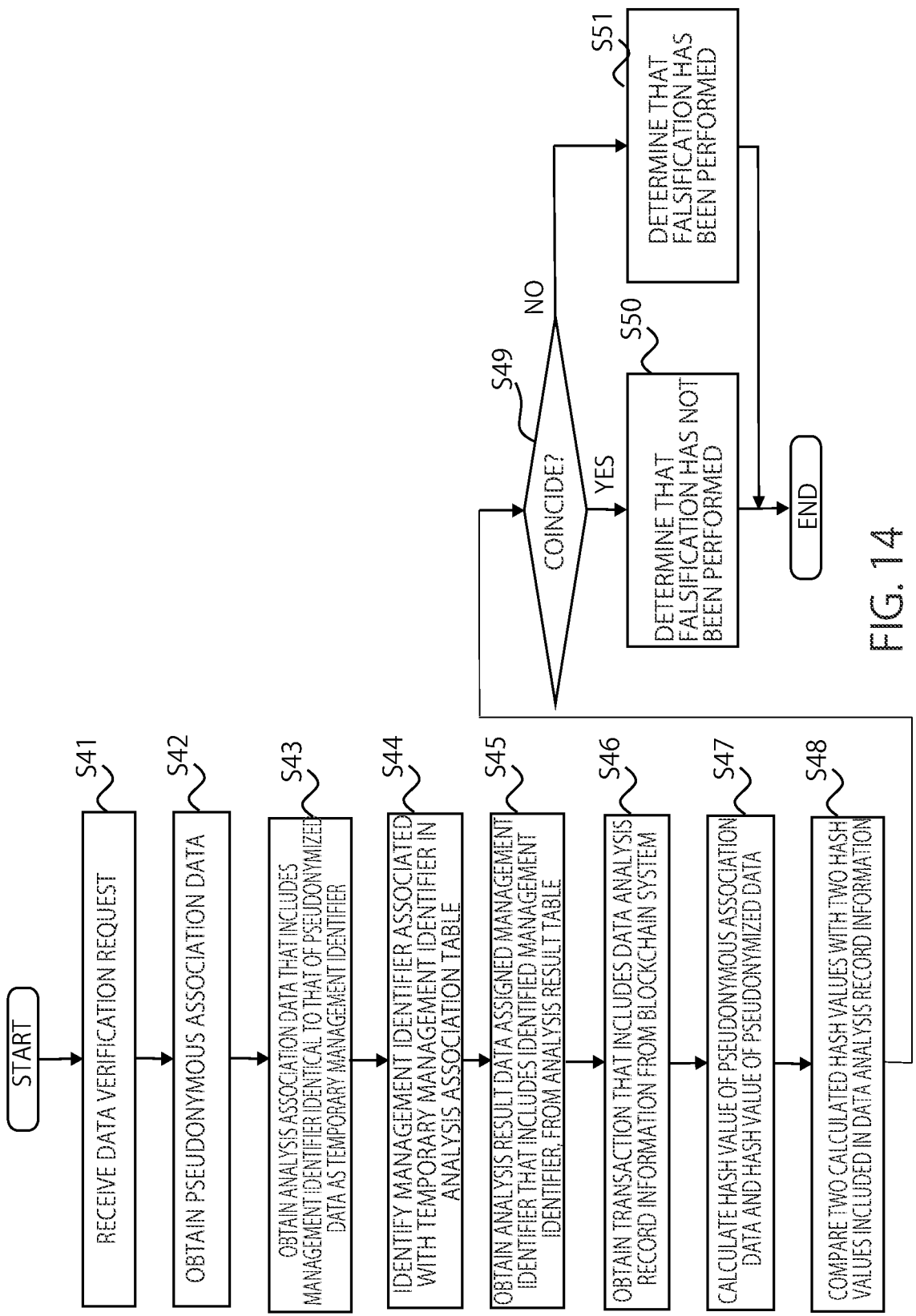
FIG. 14 is a flowchart showing another example of an operation of the data management apparatus.

FIG. 14 is a flowchart showing an example of the operations of the data management apparatus 10 and the blockchain system 20 when the input device 101 receives a data verification request issued by the information apparatus 30.

The input device 101 receives, from the information apparatus 30, a data verification request for analysis result data to be verified (S41). The data verification request includes information for identifying the analysis result data to be verified, as verification target identification information. The verification target identification information includes, for example, the data items used for data analysis and the values of the data items, and information (analyzer ID) that identifies the business operator having analyzed the target data. Information on the method used for data analysis may be included. In a case where the personal identification information is designated when data analysis is requested, the personal identification information that identifies the person may be included.

The reference processor 1026 obtains the pseudonymized data that includes the data items identified by the verification target identification information and the values of the data items, from the pseudonymization table of the data holding device 103 (S42). In the example in FIG. 10 described above, when the verification target identification information designates the gender "GENDER", birth year "1900" and medical checkup result "FFFF", pseudonymized data that includes a set of "FEMALE", "1900" and "FFFF" is obtained. When the verification target identification information designates the specific person, pseudonymized data about this person is obtained.

The reference processor 1026 identifies the management identifier included in the obtained pseudonymized data, as the temporary management identifier (management identifier "A"), and obtains the analysis association data that includes the temporary management identifier, from the analysis association table of the data holding device 103 (S43). The management identifier (management identifier "B") associated with the temporary management identifier according to the analysis association data is identified (S44). The analysis result data assigned the management identifier that includes the identified management identifier (management identifier "B") is obtained from the analysis result table of the data holding device 103 (S45). The data items of the target data included in the obtained analysis result data assigned the management identifier are identified (the same S45).

The reference processor 1026 of the anonymization management device 102 obtains the BC user ID from the user table of the user information storage 1028 on the basis of the personal identification information (name of the person etc.) in the pseudonymous association data corresponding to the pseudonymized data described above. The reference processor 1026 obtains the consent information that includes the obtained BC user ID as the personal ID from the consent information table of the consent information storage 1027, and identifies the consent ID included in the consent information. The reference processor 1026 transmits, to the blockchain system 20, the request information to retrieve (obtain) the transaction that includes the data analysis record information including the consent ID and the data items identified as described above. The reference processor 1026 receives, from the blockchain system 20, the transaction retrieved on the basis of the request information (S46). The reference processor 1026 verifies the digital signature included in the transaction, and subsequently obtains the data analysis record information included in the transaction.

The hashing processor 1023 calculates the hash value of the analysis association data described above, and the hash value of the analysis result data assigned the management identifier described above (S47). The hash value of the analysis association data, and the hash value of the analysis result data assigned the management identifier are obtained using the hashing processor 1023.

The data verifier 1025 verifies whether the hash value of the obtained analysis association data and the hash value of the obtained analysis result data assigned the management identifier coincide with the hash value of the analysis association data and the hash value of the analysis result data assigned the management identifier that are included in the data analysis record information (S48).

If both coincide (YES in S49), it is determined that the analysis association data and the analysis result data assigned the management identifier have not been falsified (S50). That is, it is determined that the analysis result data has not been falsified. If any one does not coincide (NO in S49), it is determined that the analysis result data, the analysis association data or the like has been falsified (S51). Specifically, if the hash values of the analysis association data do not coincide with each other, it may be determined that the analysis association data has been falsified. If the hash values of the analysis result data assigned the management identifier do not coincide with each other, it may be determined that the pseudonymized data or the analysis result data has been falsified. The output device 105 transmits result information on the falsification verification to the information apparatus 30, which is the originator of the data verification request.

As described above, according to the second embodiment, when the analysis result data is generated by analyzing the target data, the management identifier is generated through pseudonymization, and the analysis association data that associates the management identifier with the identification information on the target data is stored in the association relationship storage. The hash value of the analysis association data is recorded in the blockchain system. When it is intended to verify the validity (presence or absence of falsification) of the analysis association data, the hash value is read from the blockchain system, and the hash value of the analysis association data read from the association relationship storage is calculated. If the calculated hash value coincides with the hash value read from the blockchain system, it is determined that the analysis association data has not been falsified. When the analysis result data has thus been pseudonymized, the target data to which data analysis has been applied can be thereby correctly identified.

Furthermore, according to this embodiment, the analysis result data that is assigned the management identifier and associates the analysis result data with the management identifier is stored in the data holding device, and the hash value of the analysis result data assigned the management identifier is recorded in the blockchain system. When it is intended to verify the validity (presence or absence of falsification) of the analysis result data assigned the management identifier, the hash value of the analysis result data assigned the management identifier is read from the blockchain system. The read hash value of the analysis result data assigned the management identifier is calculated. The calculated hash value is compared with the hash value read from the blockchain system. If both the values coincide with each other, it is determined that the analysis result data assigned the management identifier has not been falsified. When the pseudonymization has thus been performed, the validity (presence or absence of falsification) of the analysis result data can be determined.

Modified Example 1

The data analyzer 104 may perform data analysis using a plurality of pieces of personal data. For example, there is a statistical process for a certain data item in the personal data on multiple people. Furthermore, there is a learning process of constructing an AI (artificial intelligence) model where a plurality of pieces of personal data are adopted as learning data. In some cases, a plurality of analysis processes are applied to a plurality of pieces of personal data (pseudonymized data), and a plurality of analysis results are obtained.

Figure 15:
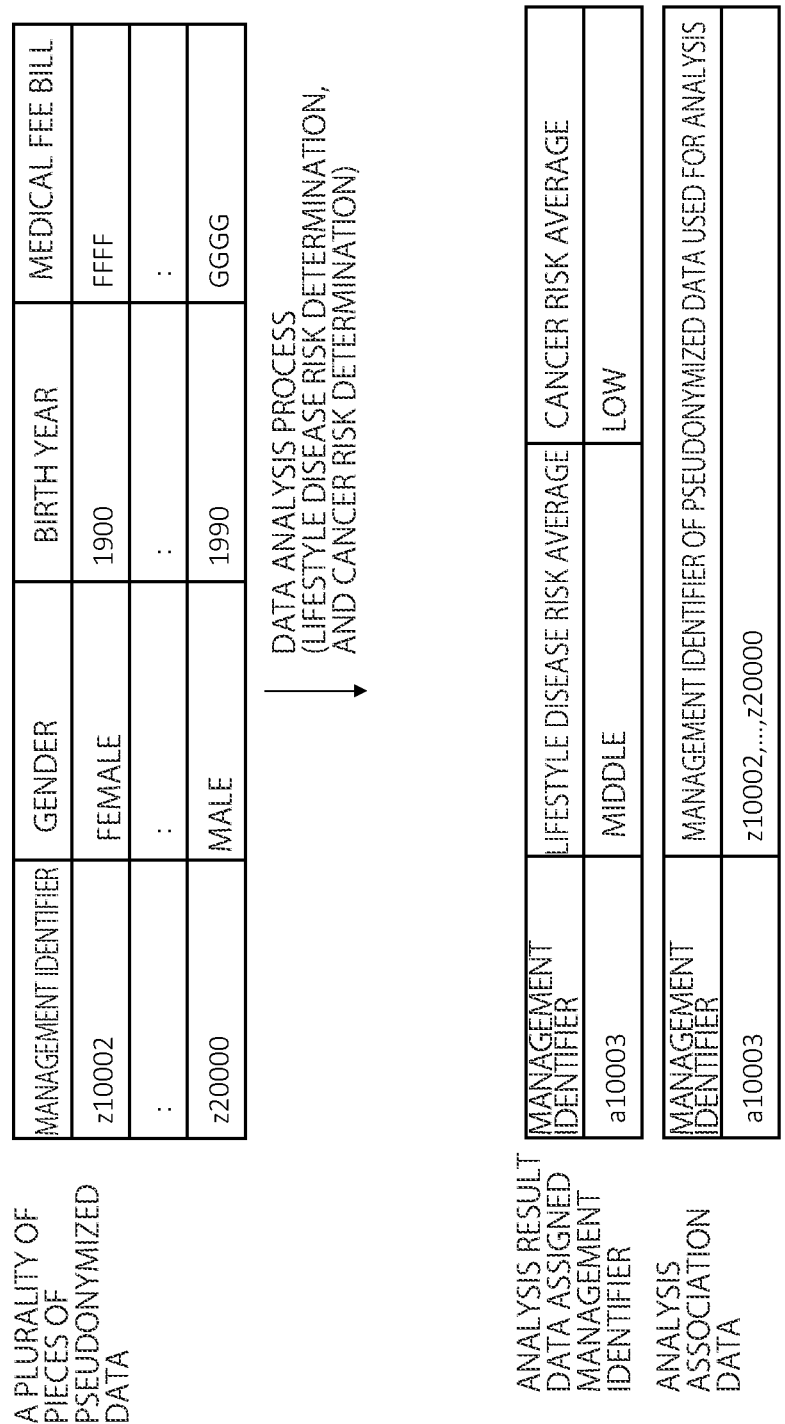
FIG. 15 shows an example of data analysis using a plurality of pieces of personal data.

FIG. 15 shows an example where the data analyzer 104 performs data analysis using a plurality of pieces of personal data (pseudonymized data).

The data analyzer 104 applies the lifestyle disease risk determination method and the cancer risk determination and analysis method designated by the analysis method identification information, to the pieces of pseudonymized data that include the management identifier, gender, and medical checkup result. The lifestyle disease risk average and the cancer risk average are calculated as the analysis result data. The newly generated management identifier ("a10003" in the diagram) is associated with the analysis result data, and the analysis result data assigned the management identifier is obtained.

Analysis association data is generated that includes the management identifier ("a10003" in the diagram), and all the management identifiers of the pseudonymized data used for data analysis. The analysis result data assigned the management identifier is stored in the analysis result table of the data holding device 103. The analysis association data is stored in the analysis association table of the association relationship storage 1022.

The entire pseudonymized data used for data analysis can be identified using the analysis result data assigned the management identifier together with the analysis association data. Accordingly, the analysis result data can be managed in a state where the privacy is protected in normal times. When necessity of performing a reproductive experiment on the analysis result and of verifying the appropriateness of the analysis result occurs, the personal data used to obtain the analysis result can be easily identified. Note that the above description is only an example. Data analysis using a plurality of pieces of personal data is not limited to that of the average value. Any statistical process, an AI model creation process, and an inference process using AI may be performed.

Modified Example 2

Figure 16:
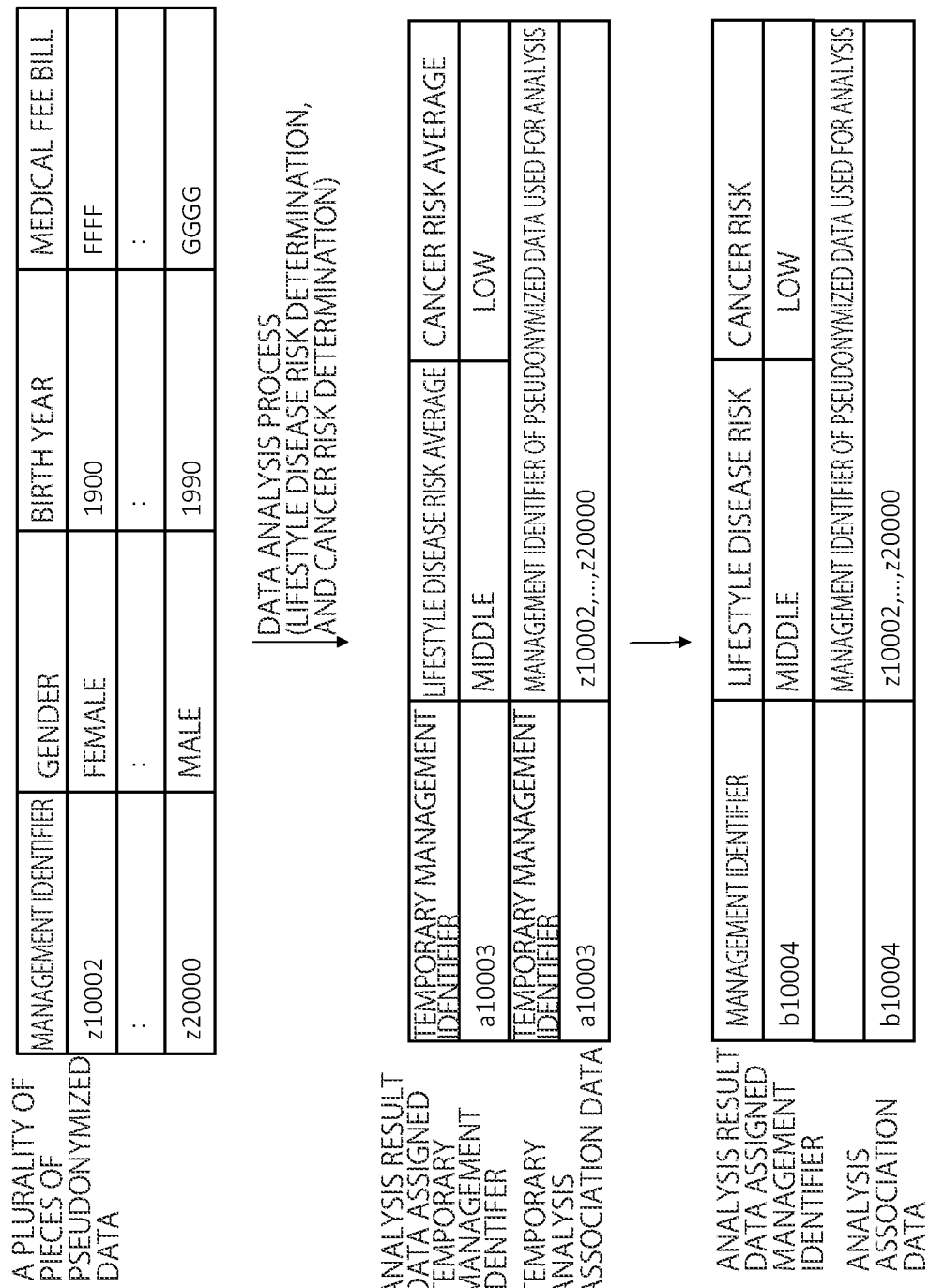
FIG. 16 shows another example of data analysis using a plurality of pieces of personal data.

FIG. 16 shows another example where the data analyzer 104 performs data analysis using a plurality of pieces of personal data (pseudonymized data).

The data analyzer 104 applies the lifestyle disease risk determination and the cancer risk determination and analysis method designated by the analysis method identification information, to the pieces of pseudonymized data that include the management identifier, gender, and medical checkup result. The lifestyle disease risk average and the cancer risk average are calculated as the analysis result data. The temporary management identifier "a10003" is generated as the management identifier, the generated temporary management identifier is associated with the analysis result data, and the analysis result data assigned the temporary management identifier is obtained.

The data analyzer 104 generates temporary analysis association data that associates the temporary management identifier "a10003" with the management identifier of the entire pseudonymized data used for analysis.

The data analyzer 104 generates a new management identifier "b10004", and replaces the temporary management identifier "a10003" of the analysis result data assigned the temporary management identifier, with the generated management identifier, thereby generating the analysis result data assigned the management identifier. The temporary management identifier "a10003" of the temporary analysis association data is replaced with the generated management identifier "b10004", thereby generating the analysis association data. The analysis result data assigned the management identifier is stored in the analysis result table of the data holding device 103. The analysis association data is stored in the analysis association table of the association relationship storage 1022.

The management identifier is assigned through intervention of the temporary management identifier as described above, thereby causing a possibility that the secrecy of the management identifier can be further improved, and more robust privacy protection can be achieved.

Modified Example 3

An example of data analysis record information generated when a plurality of pieces of personal data (pseudonymized data) are analyzed in the aforementioned modified example 1 or 2, is described.

FIG. 17 shows an example of data analysis record information according to a modified example 3. The data analysis record information includes the analysis year/month/date, consent ID or list, analyzer ID, data item ID (data type ID), the hash value of analysis association data (association data verification value), and the hash value of analysis result data assigned the management identifier (analytical data verification value). In a case where the data analysis record information is stored on a person-by-person basis, the consent ID of each person is used, and the pieces of data analysis record information as many as the people are generated. In a case where data analysis record information in which pieces of information for multiple people are integrated is stored, a list where the consent IDs of the respective people are integrated is used.

Modified Example 4

It may be configured to record, in the blockchain system, the consent information that is by the person, or the owner of the personal data, and is held by the consent information storage 1027.

In this case, the anonymization management device 102 obtains the BC user ID of the owner (person) of the target data to be used for analysis, from the user table of the user information storage 1028, and obtains the consent information that includes the personal BC user ID from the blockchain system. Only when the person consents to the analysis according to the obtained consent information, the analysis process is performed.

FIG. 18 shows an example of a block generated by the record processor 1024 or the blockchain system 20. The configuration of the block is similar to that in the second embodiment described above. That is, the block includes the transaction, and the hash value of the previous block (previous block verification value). The transaction includes the BC transaction ID, the BC user ID of the analysis business operator, the data analysis record information, and the digital signature.

(Hardware Configuration)

Figure 19:
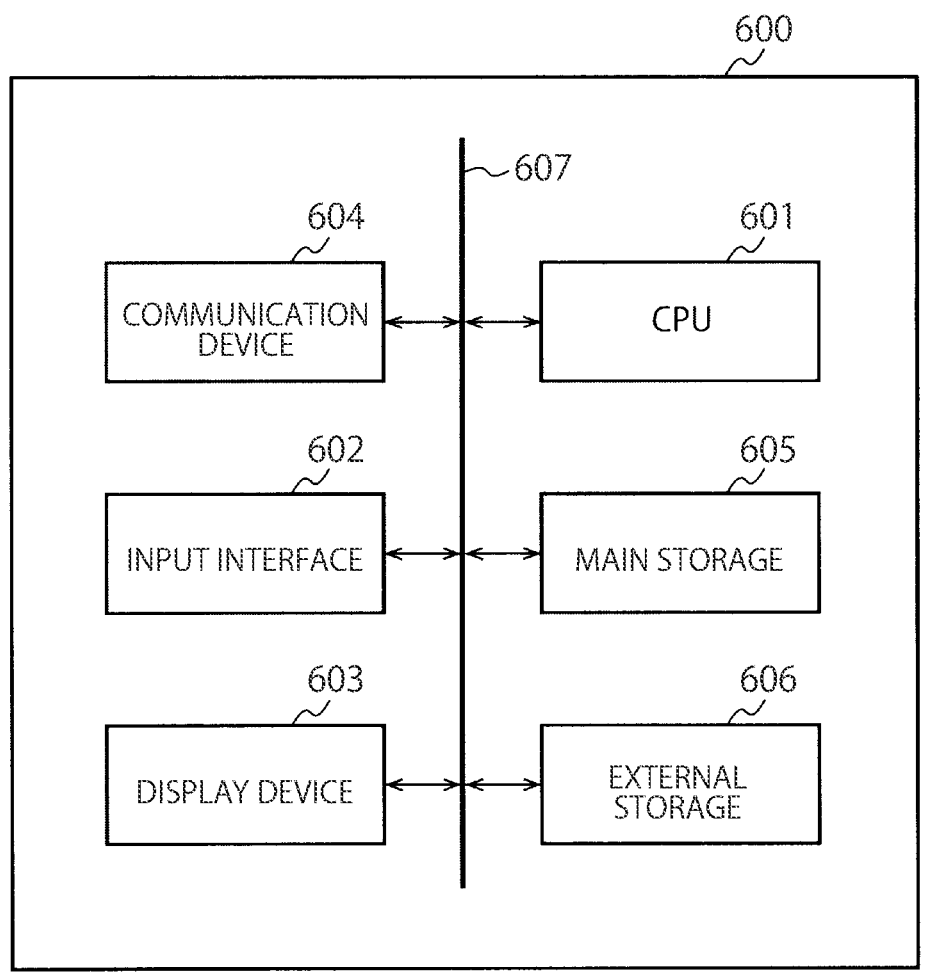
FIG. 19 shows a hardware configuration of the data management apparatus which is information processing apparatus.

FIG. 19 illustrates a hardware configuration of the data management apparatus (information processing apparatus) 101 according to the present embodiment. The information processing apparatus 101 according to the present approach is constructed of a computer apparatus 600. The computer apparatus 600 is provided with a CPU 601, an input interface 602, a display device 603, a communication device 604, a main storage 605 and an external storage device 606, which are mutually connected by a bus 607.

The CPU (central processing unit) 601 executes a computer program for implementing the above-mentioned respective functional components of the information processing apparatus 101 on the main storage 605. The CPU 601 executes the computer program and thereby implements the respective functional components.

The input interface 602 is a circuit for inputting operation signals from the input device such as a keyboard, mouse, and touch panel or the like into the data management apparatus 10. The input device 120 that carries out the input function can be constructed on the input interface 602.

The display device 603 displays data or information outputted from the data management apparatus 10. The display device 603 is, for example, an LCD (Liquid Crystal Display), a CRT (Cathode Ray Tube), and a PDP (plasma display), but the display device 603 is not limited thereto. The data or information outputted from computer apparatus 600 can be displayed by this display device 603. The output device 130 can be constructed on the display device 603.

The communication device 604 is a circuit for the information processing apparatus 101 to communicate with the external device by wireless or wired means. Information can be inputted from the external device via the communication device 604. The information inputted from the external device can be stored in the DB, the main storage 605, or the external storage device 606. The communication device 604 corresponds to transmission and reception function provided by the input device 101, the output device 105, the record processor 1024 or the reference processor 1026 etc.

The main storage 605 stores a program that implements processing of the present approach, data necessary to execute the program and data generated by executing the program. The program is developed and executed on the main storage 605. The main storage 605 may be, for example, RAM, DRAM or SRAM, but it is not limited to this. The various DBs and the storage in each approach may be constructed on the main storage 605. The data holding device of the data management apparatus 10 may be constructed on the main storage 605.

The external storage device 606 stores the above-described program and data necessary to execute the program, data generated by executing the program or the like. The program and data are read into the main storage 605 during processing of the present approach. The external storage device 606 is, for example, a hard disk, an optical disk, a flash memory or a magnetic tape, but it is not limited to this. The various DBs and the storage in each approach may be constructed on the external storage device 606.

Note that the above-described program may be pre-installed in the computer apparatus 600 or may be stored in a storage medium such as a CD-ROM. The program may be uploaded on the Internet.

Note that the computer apparatus 600 may be provided with one or a plurality of processors 601, input interfaces 602, display devices 603, communication devices 604 and main storages 605, and peripheral devices such as a printer and a scanner may be connected thereto.

In addition, the information processing apparatus 101 may be constructed of the single computer apparatus 600 or may be configured as a system composed of a plurality of mutually connected computer apparatuses 600.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing method performed by a computer, comprising:
  receiving a holding request that includes target data being data of an owner and first identification information being information that identifies the owner and, in response to the holding request, generating second identification information being a pseudonymized identifier for management purpose on a basis of at least one of a random number or a counter;
  determining whether the owner consents to holding the target data based on consent information including whether the owner consents to at least holding of the target data among reception, holding, and analysis of the target data, and in a case where the owner consents to holding the target data, generating first pseudonymized data that includes the second identification information and the target data, and holding the first pseudonymized data in a first hardware holding device;
  generating first pseudonymous association data that associates the first identification information with the second identification information, and storing the first pseudonymous association data in a first hardware storage;
  calculating a first value by an operation based on the first pseudonymous association data; and
  providing first record information for a storage system, the storage system being configured to store the first record information, the first record information including the first value and a consent ID which is an identifier of the consent information,
  wherein the information processing method further comprises:
    obtaining the first pseudonymous association data that includes the first identification information regarding the owner from the first hardware holding device, when receiving a verification request that includes the first identification information;
    obtaining, from the storage system, the first record information that includes the consent ID of the consent information of the owner;
    calculating the first value by an operation based on the obtained first pseudonymous association data; and
    verifying validity of the obtained first pseudonymous association data, based on the calculated first value and the first value included in the first record information.

2. The information processing method according to claim 1, further comprising
  calculating a second value by an operation based on the first pseudonymized data generated when receiving the holding request,
  wherein the first record information provided for the storage system further includes the second value, and the method further comprises:
    identifying the second identification information included in the first pseudonymous association data obtained when receiving the verification request, and obtaining, from the first hardware holding device, the first pseudonymized data that includes the identified second identification information;
    calculating a second value by an operation based on the obtained first pseudonymized data; and
    verifying validity of the obtained first pseudonymized data, based on the calculated second value and the second value included in the first record information.

3. The information processing method according to claim 2, further comprising
  determining that the obtained first pseudonymous association data is valid when the calculated second value coincides with the second value included in the first record information, and determining that the obtained first pseudonymous association data is invalid when the second values do not coincide with each other.

4. The information processing method according to claim 2, further comprising
  calculating a hash value of the first pseudonymized data, the hash value being the second value.

5. The information processing method according to claim 1, further comprising:
  obtaining the first pseudonymized data from the first hardware holding device, when an analysis request that includes second information identifying data to be analyzed, the first pseudonymized data including the target data according to the second information;
  performing data analysis using data identified by the second information in the target data included in the obtained first pseudonymized data;
  generating third identification information that identifies result data on the data analysis;
  generating second pseudonymized data that associates the third identification information with the result data, and holding the second pseudonymized data in a second hardware holding device;
  generating second pseudonymous association data that associates the third identification information with the second identification information included in the obtained first pseudonymized data, and storing the second pseudonymous association data in a second hardware storage;
  calculating a third value by an operation based on the second pseudonymous association data;
  identifying the first identification information, based on the first pse udonymous association data including the second identification information, the first identification information being associated with the second identification information included in the first pseudonymized data obtained when receiving the analysis request; and providing the storage system with second record information, the second record information including the third value and including the consent ID of the consent information associated with the identified first identification information.

6. The information processing method according to claim 5, further comprising:

obtaining the first pseudonymized data from the first hardware holding device, when receiving a verification request that includes the second information, the first pseudonymized data including the target data according to the second information;

obtaining, from the second hardware storage, the second pseudonymous association data that includes the second identification information included in the obtained first pseudonymized data;

calculating a third value by an operation based on the obtained second pseudonymous association data;

identifying the first identification information associated with the second identification information included in the obtained first pseudonymized data, based on the first pseudonymous association data that includes the second identification information, and obtaining, from the storage system, the second record information that includes the consent ID of the consent information associated with the identified first identification information; and verifying validity of the obtained second pseudonymous association data, based on the calculated third value and the third value included in the second record information obtained from the storage system.

7. The information processing method according to claim 6, further comprising calculating a fourth value by an operation based on the second pseudonymized data generated when receiving the analysis request;

wherein the second record information provided for the storage system further includes the fourth value, and the method further comprises: identifying the third identification information included in the second pseudonymous association data obtained when receiving the verification request, and obtaining, from the second hardware holding device, the second pseudonymized data that includes the third identification information;

calculating a fourth value by an operation based on the obtained second pseudonymized data; and verifying validity of the obtained second pseudonymized data, based on the calculated fourth value and the fourth value included in the second record information obtained from the storage system.

8. The information processing method according to claim 7, further comprising determining that the obtained second pseudonymized data is valid when the calculated fourth value coincides with the fourth value included in the second record information, and determining that the obtained second pseudonymized data is invalid when the fourth values do not coincide with each other.

9. The information processing method according to claim 7, further comprising calculating a hash value of the second pseudonymized data, the hash value being the fourth value.

10. The information processing method according to claim 6, further comprising determining that the obtained second pseudonymous association data is valid when the calculated third value coincides with the third value included in the second record information, and determining that the obtained second pseudonymous association data is invalid when the third values do not coincide with each other.

11. The information processing method according to claim 5, further comprising obtaining a plurality of pieces of the first pseudonymized data, when receiving the analysis request, wherein the second pseudonymous association data associates the third identification information with a plurality of pieces of the second identification information included in the plurality of pieces of the first pseudonymized data.

12. The information processing method according to claim 5, further comprising calculating a hash value of the second pseudonymous association data, the hash value being the third value.

13. The information processing method according to claim 1, further comprising obtaining the consent ID associated with the first identification information, based on first association information data that associates the first identification information with the consent ID.

14. The information processing method according to claim 1, further comprising determining that the obtained first pseudonymous association data is valid when the calculated first value coincides with the first value included in the first record information, and determining that the obtained first pseudonymous association data is invalid when the first values do not coincide with each other.

15. The information processing method according to claim 1, further comprising calculating a hash value of the first pseudonymous association data, the hash value being the first value.

16. A non-transitory computer readable medium having a computer program stored therein which the computer program is executed by a computer, cause the computer to perform processes, comprising:

receiving a holding request that includes target data being data of an owner and first identification information being information that identifies the owner and, in response to the holding request, generating second identification information being a pseudonymized identifier for management purpose on a basis of at least one of a random number or a counter;

determining whether the owner consents to holding the target data based on consent information including whether the owner consents to at least holding of the target data among reception, holding, and analysis of the target data, and in a case where the owner consents to holding the target data, generating first pseudonymized data that includes the second identification information and the target data, and holding the first pseudonymized data in a first hardware holding device;

generating first pseudonymous association data that associates the first identification information with the second identification information, and storing the first pseudonymous association data in a first hardware storage;

calculating a first value by an operation based on the first pseudonymous association data; and providing first record information for a storage system, the storage system being configured to store the first record information, the first record information including the first value and a consent ID which is an identifier of the consent information,
wherein the processes further comprises:
   obtaining the first pseudonymous association data that includes the first identification information regarding the owner from the first hardware holding device, when receiving a verification request that includes the first identification information;
   obtaining, from the storage system, the first record information that includes the consent ID of the consent information of the owner;
   calculating the first value by an operation based on the obtained first pseudonymous association data; and
   verifying validity of the obtained first pseudonymous association data, based on the calculated first value and the first value included in the first record information.

17. An information processing system comprising:
a data management apparatus; and
a blockchain system connected with the data management apparatus via a communication network,
wherein
the data management apparatus comprises:
   processing circuitry configured to
      receive a holding request that includes target data being data of an owner and first identification information being information that identifies the owner and, in response to the holding request, generate second identification information being a pseudonymized identifier for management purpose on a basis of at least one of a random number or a counter,
      determine whether the owner consents to holding the target data based on consent information including whether the owner consents to at least holding of the target data among reception, holding, and analysis of the target data,
      in a case where the owner consents to holding the target data, generate first pseudonymized data that includes the second identification information and the target data, generate first pseudonymous association data that associates the first identification information with the second identification information, and calculate a first value by an operation based on the first pseudonymous association data;
   a first hardware holding device configured to hold the first pseudonymized data;
   a first hardware storage configured to store the first pseudonymous association data,
wherein
   the processing circuitry is configured to transmit request information to request to add first record information to the blockchain for the blockchain system, the first record information including the first value and a consent ID which is an identifier of the consent information, and
   the blockchain system is configured to add a block including the first record information to the blockchain based on the request information, and
wherein the processing circuitry is further configured to:
   obtain the first pseudonymous association data that includes the first identification information regarding the owner from the first hardware holding device, when receiving a verification request that includes the first identification information;
   obtain, from the blockchain system, the first record information that includes the consent ID of the consent information of the owner;
   calculate the first value by an operation based on the obtained first pseudonymous association data; and
   verify validity of the obtained first pseudonymous association data, based on the calculated first value and the first value included in the first record information.

* * * * *